United States Patent [19]

Keegan

[11] Patent Number: 4,972,431
[45] Date of Patent: Nov. 20, 1990

[54] P-CODE-AIDED GLOBAL POSITIONING SYSTEM RECEIVER

[75] Inventor: Richard G. Keegan, Torrance, Calif.

[73] Assignee: Magnavox Government and Industrial Electronics Company, Fort Wayne, Ind.

[21] Appl. No.: 412,049

[22] Filed: Sep. 25, 1989

[51] Int. Cl.⁵ .......................... H04K 1/00; H04B 7/185
[52] U.S. Cl. ........................................... 375/1; 380/9; 342/357
[58] Field of Search .................... 375/1; 342/352, 357; 380/9, 46

[56] References Cited

U.S. PATENT DOCUMENTS

| | | | |
|---|---|---|---|
| 4,667,203 | 5/1987 | Counselman, III | 342/357 |
| 4,701,934 | 10/1987 | Jasper et al. | 375/1 |
| 4,785,463 | 11/1988 | Janc et al. | 375/1 |
| 4,870,422 | 9/1989 | Counselman, III | 342/357 |

*Primary Examiner*—Salvatore Cangialosi
*Attorney, Agent, or Firm*—Noel F. Heal; Thomas A. Briody; Richard T. Seeger

[57] ABSTRACT

Method and apparatus for use in a global positioning system (GPS), to obtain the benefit of L2 carrier signals and precise-code (P-code) signals transmitted from satellites in encrypted form. Received, encrypted P-code signals are correlated with a locally generated P-code sequence and the resulting signal is bandpass filtered and squared, to separate one satellite signal from the others, to recover the carrier signal and make accurate measurement of its phase and pseudorange, even though the received P-code sequence is encrypted. Because the squaring step is performed over a narrower bandwidth than the original P-code, there is less degradation in the signal-to-noise ratio of the received signal, as compared with squaring over the entire P-code bandwidth. Therefore, performance is more reliable under weak signal conditions or when there are interference signals present, and the improvement in signal quality means that cycle ambiguity of the carrier signals can be resolved more rapidly. Moreover, the invention does not frustrate the intended purpose of P-code encryption.

32 Claims, 11 Drawing Sheets

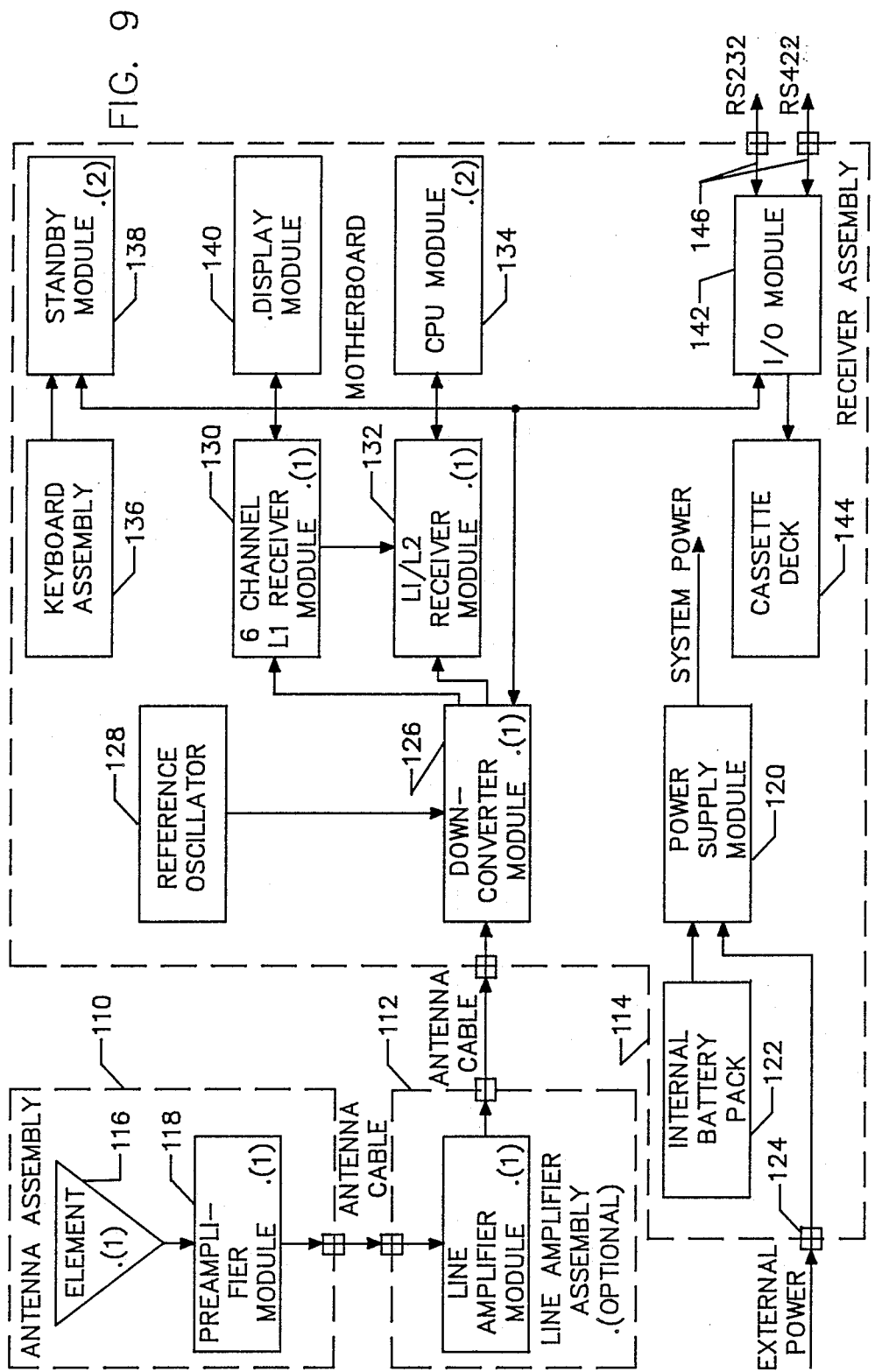

P-CODE-AIDED GLOBAL POSITIONING SYSTEM RECEIVER

BACKGROUND OF THE INVENTION

This invention relates generally to global positioning systems and, more particularly, to techniques for improving the speed and accuracy of differential survey results obtained from global positioning systems. In the terminology of GPS (Global Positioning System), the invention relates to techniques for obtaining code and phase measurements of a suppressed carrier signal known as L2, in spite of "anti-spoofing" encryption of the signals that modulate L2. As will be described, "code" measurements are measurements of the apparent distances or "pseudoranges" of satellites with respect to a receiver, as determined from event times of the codes or signals used to modulate L2.

There are two important advantages to obtaining access to the L2 carrier signal. One is that measurement of the carrier phase provides a higher level of relative or differential position-finding accuracy than is available from code measurements alone. The second advantage is that access to L2 permits the faster resolution of carrier cycle ambiguity that is inherent in position determination using carrier signal detection.

GPS, also called NAVSTAR, is a system for determining the position of a user on or near the earth, from signals received from multiple orbiting satellites. When the system is fully deployed, the orbits of the satellites will be arranged in multiple orbit planes, such that signals can be received from at least four satellites at any selected point on or near the earth.

The orbits of the orbiting spacecraft are determined with accuracy from fixed ground stations and are relayed back to the spacecraft. In navigation applications of GPS, the latitude, longitude and altitude of any point close to the earth can be calculated from the times of propagation of electromagnetic energy from four or more of the spacecraft to the point on or near the earth. In general, at least four satellite signals need to be received at a ground station in order to determine the complete position, since there are four unknown quantities. Three of the unknowns are the threedimensional position coordinates, which may be conveniently expressed in terms of latitude, longitude and altitude, and the fourth unknown quantity is a time difference or offset between timing clocks on the satellites and a timing clock at the receiver. For normal operation of the system, the clocks used to regulate operation of transmitters on the satellites are effectively all synchronized, or at least the differences between them are known. However, the clock used to control operations at the receiver is typically out of synchronization with the satellite clocks to some degree, and this error cannot be eliminated without having the benefit of one more satellite measurement than there are position coordinates to be determined. Thus, for three-dimensional position determination, at least four satellite signals are needed.

The nature of the signals transmitted from GPS satellites is well known from the literature, and will be described in more detail in the description of the preferred embodiment of the invention. In brief, each satellite transmits two spread-spectrum signals in the L band, known as L1 and L2, with separate carrier frequencies. Two signals are needed to eliminate an error that arises due to the refraction of the transmitted signals by the ionosphere. The satellite signals are modulated by two pseudorandom codes, one referred to as the C/A (coarse/acquisition) code, and the other referred to as the P (precise) code, and by a slower-varying data signal defining the satellite orbits and other system information. A pseudorandom code sequence is a series of numbers that are random in the sense that each one bears no discernible relation to the ones that precede it, but are not truly random, because the sequence repeats itself cyclically.

When a binary pseudorandom code is used to modulate the phase of a carrier signal, the result is a signal having a spectral density that follows a $[(\sin x)/x]^2$ distribution. This "spread spectrum" signal has the advantage of being more immune to jamming or interference than a narrowband signal. The spectrum of a signal modulated by a pseudorandom code has the useful property that, when the signal is properly correlated with a replica of the same pseudorandom code, the spread spectrum energy is mapped as a large narrow peak in the spectrum, but only if the two correlated signals are properly synchronized in time. This property can be used to identify and separate signals from multiple satellites, by correlating a received signal with multiple locally generated pseudorandom code sequences. Each GPS satellite uses unique P code and C/A code sequences, which are publicly known. Therefore, a particular satellite is identifiable by the correlation of a received signal with a locally generated code sequence corresponding to that satellite. Once a received signal is identified and decoded, the receiver can measure an apparent transmission time from the satellite, from which an apparent range, or pseudorange, is computed. Signals transmitted from each satellite define the time and position of the satellite at certain signal epochs whose times of reception can be measured at the receiver. The transmit times are all measured with reference to a common time base referred to as GPS system time. Each receiver uses its own local time reference for recording the receive times of signals from the satellites. Thus each receiver has knowledge of the transmit times measured in GPS system time and the receive times measured in local time. If there is at least one more satellite signal than there are positional unknown quantities, the time differential between the local time and satellite time can be determined along with the positional unknown quantities. For example, four satellite signals are needed to find three positional unknowns and the time differential. From the pseudo-range data, the position of the receiver on or near the earth can be computed to a high degree of accuracy, depending on the accuracy of the orbit data.

For most civil navigation applications, such as for navigation at sea, only the C/A code is needed and errors due to ionospheric refraction can be ignored. Such a receiver need only perform its computations based on an analysis of the C/A code signal modulated onto the L1 carrier frequency. However, for more precise differential or survey applications, use of the P code modulated onto the L2 carrier, as well as the C/A code modulated onto the L1 carrier, provides a more precise determination of relative position because the availability of two carrier frequencies allows compensation for ionospheric refraction errors, which are frequency dependent.

Survey applications differ from purely navigational applications of GPS in two principal respects. First, survey work requires a higher level of accuracy than most navigational applications. Fortunately, this higher accuracy can be obtained because of the second difference between the two types of applications, which is that survey work for the most part involves measurements of the position of one point with respect to another, rather than the absolute determination of position. In most survey work, a benchmark or reference position is known to a high degree of accuracy, and the relative positions of other points are determined with respect to the benchmark. A line between the benchmark and another point is sometimes referred to as a baseline.

The high accuracy demanded by survey applications of GPS can best be obtained by recovering at least one of the satellite carrier signals, L1 or L2, at two receivers positioned at the ends of the baseline, and measuring the phase of the carrier at synchronized time points at the two positions. The L1 carrier signal has a wavelength of approximately 19 centimeters (cm). If its phase can be determined to an accuracy of less than approximately ten degrees, distance measurements can be made to an accuracy of better than five millimeters.

One difficulty in making distance measurements based on carrier phase detection is that of resolving ambiguities in the carrier signal phase. Once a receiver has acquired or locked onto an incoming carrier signal, each successive cycle of the carrier is identical and the receiver may be unable to determine which cycle is being received at any instant in time. The actual approach used by survey instruments to resolve this carrier cycle ambiguity is to solve for the position of the instrument to an accuracy level of one carrier cycle, i.e. to an accuracy of $+9.5$ cm to $-9.5$ cm. Two possible ways of determining the position to this level of accuracy either to use a sufficient number of pseudo-range measurements or to use integrated Doppler measurement with sufficient geometry between endpoints. The first method uses a large number of pseudorange (or code) measurements to average out the noise in each individual measurement. This becomes a viable approach for P-code measurements since each P code chip is only 30 meters long, with thermal noise of each sample being only a few meters (neglecting signal multipath effects). However, for C/A code measurements the approach is much less viable, since the chip length is 300 meters and the noise is similarly larger (with multipath effects being more pronounced). Therefore, the required averaging time would be extremely long. The second approach to position determination based on carrier phase measurements is similar to hyperbolic navigation measurements used in other systems, such as Loran-C and Transit. This method develops several (one for each satellite begin tracked) hyperbolic lines-of-position defined by a range difference between two positions of the same satellite as it traverses its orbit. The range difference is determined by the integrated Doppler measurements of the received signal between the two endpoints defined by the two satellite positions. The accuracy of the measurement is largely determined by the separation of the endpoints (the geometry of the measurement) and the accuracy required from each measurement is largely determined by the relative geometries between the satellites. In any event, by use of one of these techniques, the phase ambiguity of the received carrier signal is resolved, i.e. it is possible to determine which cycle is being received, and phase measurements within one cycle then permit very precise measurements to be made.

The difficulty with this approach is that it may take an inconveniently long time to accumulate enough measurement samples to eliminate the carrier cycle ambiguity. A faster technique uses a difference frequency L1-L2 to reduce the measurement accuracy needed to resolve carrier cycle ambiguity. The difference or beat frequency L1-L2 has a frequency of approximately 350 MHz and a wavelength of approximately 86 cm. Therefore, there are between four and five cycles of the L1 carrier for one cycle of the difference frequency. In essence, then, each receiver need only accumulate enough samples to determine position to within 86 cm., as compared with 19 cm., in order to resolve the carrier cycle ambiguity. This is one of two reasons why access to the L2 GPS signal is highly important for survey applications. With access to L1 only, a large number of samples must be accumulated at each receiver in order to resolve carrier cycle ambiguity during post-processing.

The other reason that access to L2 is important is to compensate for ionospheric effects on the GPS signals. Since different frequencies are refracted differently by the ionosphere, the effect of ionospheric refraction on a GPS signal can be determined with good accuracy by observing the phase changes between the two signals. The L1 and L2 signals are coherent when transmitted. That is to say, their relative phase is fixed. The relative phase of the two carriers upon reception provides a measure of the ionospheric refraction effect, and the phase of L1 can be compensated accordingly. When measuring short baselines, ionospheric compensation is of little value, since the transmission paths to both receivers are practically identical. However, for longer baseline measurements, the signals received take substantially different paths through the ionosphere, and compensation is needed for accurate results.

In an effort to ensure that the P code cannot be generated by bogus transmitters attempting to "spoof" the system, the United States Government, which operates the GPS system, has implemented an "anti-spoofing" measure. The P code will be encrypted in some manner, during at least part of the time that the system is in operation. The government can turn the encryption on or off as desired. If the system is to be used as intended, received encrypted P-code signals must be correlated with a locally generated encrypted P-code sequence. Without knowledge of the encryption process or access to an encryption key, the measurement of pseudoranges using currently available receiver technology is a practical impossibility.

As mentioned earlier, the GPS signals are intended to be recovered by correlating each incoming signal with a locally generated replica of the code: P code or C/A code. The carrier in the GPS signals is totally suppressed when the modulating signal is a pseudorandom code sequence like the P code or the C/A code. In other words, the received L2 signal contains no component at the L2 frequency. Yet it is important for survey applications to be able to reconstruct the L2 carrier and to measure its phase. So long as the P code is not encrypted, the L2 carrier is easily recovered by correlation of the received signal with the locally generated P code replica. The locally generated code is adjusted in timing to provide an optimum correlation with the incoming signal. The correlation output is then a single narrowband peak centered at the carrier frequency.

That is to say, recovery of the carrier is the natural result of the correlation process used to identify and separate incoming GPS signals. Moreover, the carrier recovered by correlation provides the best available signal-to-noise ratio.

Although the L2 carrier cannot be recovered by this correlation process when the P code is encrypted, L2 can still be recovered by squaring the incoming signal; that is, multiplying the signal by itself. As is well known, this has the effect of removing all biphase modulation from the signal, and producing a single-frequency output signal at twice the frequency of the suppressed carrier. Therefore, the L2 carrier signal can be obtained by squaring, regardless of whether or not the the modulating P code is encrypted. A serious drawback of this procedure is that squaring the signal also squares its noise component. The resulting signal-to-noise ratio for the recovered L2 carrier signal is significantly degraded by the squaring process, by 30 dB (decibels) or more compared with the ratio for the carrier recovered by correlation.

In U.S. Pat. No. 4,667,203 to Counselman, III, a variation of the squaring technique is proposed, whereby the incoming signal is divided into upper and lower sidebands, which are multiplied together to obtain the second harmonic of the carrier signal. However, degradation of the signal-to-noise ratio is the same with this process as with squaring the entire signal.

It will be appreciated from the foregoing that a better method is needed for access to the L2 carrier in GPS signals, without the SNR degradation that results from simply squaring the received GPS L2 signal. The present invention is directed to this end.

SUMMARY OF THE INVENTION

The present invention resides in a method and apparatus for recovering the L2 carrier from signals received from GPS satellites, even though the P-code signals on these carriers are encrypted. A further benefit of the invention is that pseudo-range signals can be derived from the encrypted P-code signals. Briefly, and in general terms, the method of invention comprises the steps of receiving a signal transmitted from one of a plurality of satellites, the signal containing an encrypted version of a pseudorandom code sequence known as P code, independently generating a replica of the P-code pseudorandom code sequence, correlating the received signal with the locally generated replica of the P-code sequence, bandpass filtering the result of the correlation step, and squaring the correlated and filtered signal to recover a harmonic of the carrier signal with a more favorable signal-to-noise ratio than has been previously possible. The method of the invention also preferably includes the step of identifying and separating incoming signals from multiple satellites, by means of locally generated P code sequences.

As presently preferred, the method also includes controlling the step of generating a replica of the P-code sequence, to maximize the peak in the correlated frequency spectrum. Further, the step of bandpass filtering the result of the correlating step is performed with a bandwidth of approximately 500 kilohertz, although improvement over conventional squaring of the signal can be seem with a bandwidth greater than 25 kilohertz and less than 10 megahertz. In more general terms, the bandwidth of the filtering step should be approximately from $-f_n/2$ to $+f_n/2$, where $+f_n$ and $-f_n$ are the frequencies of primary null points in the frequency spectrum obtained in the correlating step.

The essence of the invention is that the correlation of the received encrypted P code signal with a locally generated replica of the P code signal results in a spread-spectrum signal that is reduced in bandwidth. The bandwidth reduction in the preferred embodiment of the invention is from approximately $\pm 10$ megahertz to $\pm 500$ kilohertz. By squaring the signal after filtering to $\pm 250$ kilohertz, the resultant signal-to-noise ratio is greater than would be achieved by squaring in a 10 megahertz bandwidth.

In terms of apparatus, the invention in its broadest terms resides in a combination of GPS receiver components for deriving L2 carrier signals from received GPS signals. The apparatus includes a receiving antenna, for receiving a GPS signal transmitted from one of a plurality of satellites, the signal containing an encrypted version of a pseudorandom code sequence known as P code, a P-code generator, for independently generating a replica of the P-code pseudorandom sequence, and a correlator circuit, for correlating the received encrypted P-code sequence with the locally generated replica of the P-code sequence. The apparatus further includes a bandpass filter, for filtering the signal obtained from the correlator circuit, and a squaring circuit, for squaring the correlated and filtered signal to recover the second harmonic of the suppressed carrier signal with a more favorable signal-to-noise ratio. The apparatus may also include digital processing circuitry for controlling the step of generating a replica of the P-code sequence and for maximizing a spectral peak in the output of the correlator circuit. Preferably, the bandpass filter has a bandwidth of approximately 500 kilohertz, although, as mentioned above, improvement may be obtained with filter bandwidths between 25 kilohertz and 10 megahertz.

It will be appreciated from the foregoing and from the following more detailed description that the invention provides a significant improvement over prior techniques for recovering the L2 carrier signal when its modulating P code has been encrypted. In particular, squaring the correlated P-code signal over a narrower bandwidth than that of the entire P-code sequence results in improved signal-to-noise performance. Correlation of the encrypted P code also permits a desired satellite signal to be identified and separated from others. Other aspects and advantages of the invention will become apparent from the following more detailed description taken in conjunction with the accompanying drawings.

BRIEF DESCRIPTION OF THE DRAWINGS

FIG. 8 is a graph showing the relationship between squaring bandwidth and carrier-to-noise ratio;

FIG. 9 is a block diagram of a receiver system in which the present invention may be used;

DESCRIPTION OF THE PREFERRED EMBODIMENT

Introduction

The present invention is concerned with improvements in a global positioning system (GPS) receiver, and more specifically with a GPS receiver for use in survey applications in which access to both L1 and L2 carrier signals is needed to improve the speed and accuracy of baseline measurements. Access to both carrier signals allows corrections to be made to compensate for ionospheric refraction of the GPS signals, and facilitates rapid resolution of phase ambiguities in the survey solution.

Figure 1:
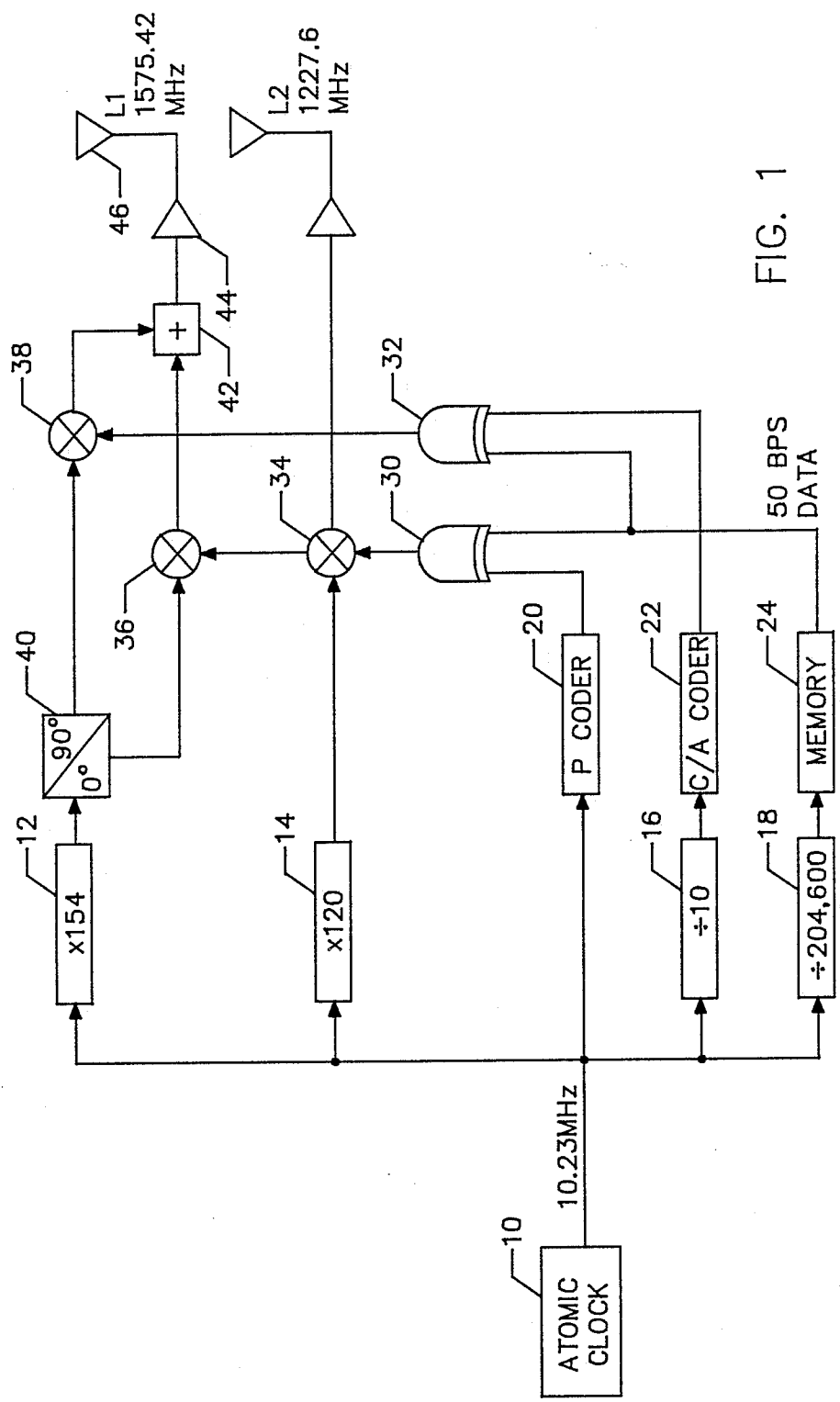
FIG. 1 is a simplified block diagram of signal transmission apparatus included in a GPS satellite.

By way of further background, FIG. 1 shows how two L-band GPS signals are synthesized for transmission from one of a plurality of GPS satellites. The transmitter on each satellite includes an atomic clock, indicated by reference numeral 10, and four frequency multipliers or dividers, 12, 14, 16 and 18. The clock frequency is 10.23 megahertz (MHz), and is multiplied by a factor of 154 in frequency multiplier 12, to provide a carrier frequency of 1575.42 MHz for a first L-band transmission, designated the L1 signal, and is multiplied by a factor of 120 in frequency multiplier 14, to provide a carrier frequency of 1227.6 MHz for a second L-band transmission, designated the L2 signal. The transmitter also includes a P-coder 20 for generation of a pseudorandom code known as the P code (for precise code), and a C/A coder 22 for generation of another pseudorandom code known as the C/A code (for coarse/acquisition code).

The P code is a two-level or binary code that changes state at a 10.23 MHz rate derived directly from the clock 10. Each bit or "chip" of the code is approximately 30 meters long as transmitted through space, and the duration of the code is one week. That it to say, each full cycle of the code sequence is one week long. The C/A code changes state at a frequency only onetenth that of the P code, i.e. at a rate of 1.023 MHz, derived from the clock 10 through frequency divider 16. The C/A code has a duration of 1,023 chips; which means that the code repeats after 1,023 code elements. Each full cycle of the C/A code takes one millisecond (1 ms), and each C/A code chip is approximately 300 meters in length as transmitted.

The remaining frequency divider 18 in the transmitter has a dividing factor of 204,600, to produce a clock rate of 50 hertz, for addressing a memory 24, which contains data to be transmitted with the L1 and L2 signals. Outputs from the P-coder 20 and the memory 24 are connected as inputs to an exclusive OR (XOR) gate 30, and outputs from the C/A coder 22 and the memory 24 are connected as inputs to another exclusive OR (XOR) gate 32. Output from the first XOR gate 30 is connected to two mixers 34, 36, and output from the second XOR gate 32 is connected to a third mixer 38. Functional block 40 is intended to indicate that the 1575.42 L1 carrier signal is split into two quadrature components, which are next separately modulated by mixers 34 and 38, then recombined in a signal combiner 42, before amplification in amplifier 44 and transmission from an antenna 46.

It will be seen that the L1 signal is derived from a 1575.42 MHz carrier, a P-code signal combined with a data signal, and a quadrature C/A-code signal combined with the same data signal. The L2 signal is derived from a 1227.6 MHz carrier and a P-code signal combined with the data signal. Usually, the power ratio of the P code to the C/A code in the L1 signal is one half.

Figure 2:
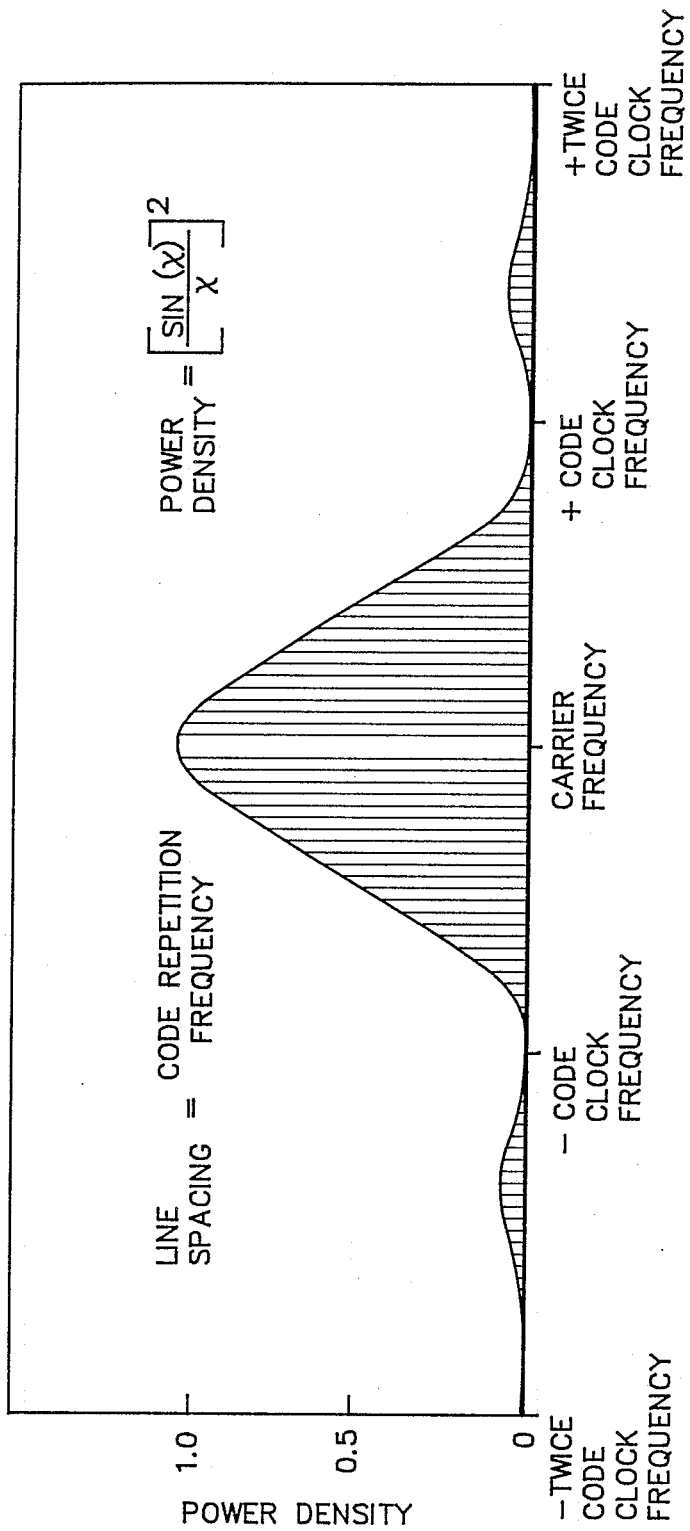
FIG. 2 is a graph showing the spectral density of a spread spectrum signal transmitted from a GPS satellite.

The frequency spectrum of a carrier signal modulated by a pseudorandom code is shown in FIG. 2. Frequency is plotted along the horizontal axis, and power density of the spectral components is plotted along the vertical axis. The vertical lines in the spectrum power density curve are spaced by a frequency equivalent to the code repetition frequency. The carrier frequency is suppressed, as indicated by the missing spectral line at the center of the distribution. The shape of the curve is of the form Power Density = $[(\sin x)/x]^2$, where x is proportional to the frequency f, given by the relation $x = \pi f/f_{clock}$, where $f_{clock}$ is the pseudorandom code clock frequency. As is apparent from FIG. 2, primary nulls in the distribution occur at frequencies $f_{clock}$ and $-f_{clock}$ with respect to the center frequency.

In a conventional GPS receiver, two important functions are performed before the receiver position can be computed. One is to measure an apparent or pseudo-range to each of at least four satellites being used (for three-dimensional position determination), it being understood that only three satellites are needed for two-dimensional position determination. The other function is to recover the data modulated onto the carrier signals. For highly accurate baseline measurements in survey applications, the carrier signals L1 and L2 are recovered from the received signals, and carrier phase information is used to derive a more accurate measurement of receiver relative position. The mathematical equations used in position determination from GPS signals are well known and form no part of the present invention.

Each receiver must be able to distinguish one satellite from another. In the usual system, each satellite generates a different pseudorandom code for its P code, and for its C/A code. The receiver has multiple channels, each of which has P-code and C/A code generators that can generate any of the satellite codes, for matching with the incoming signals and correctly identifying each satellite.

Carrier recovery by correlation

Measurement of the pseudo-range is effected by generating a replica of the P code (and/or of the C/A code), and then correlating the replica with the code received from the satellite. If the replica and the received code are properly aligned in time, the result of the correlation process is a sharply defined peak or spike in the frequency spectrum of the output signal. The spectral peak is centered at the original carrier frequency, which had been suppressed by code modulation in the satellite. Thus the correlation process may be thought of as "despreading" the received signal, to obtain the original carrier signal, still modulated with data signals at a relatively slow 50-hertz rate. The recovered carrier signal, and in particular its phase, may be used in surveying applications for precise determination of the relative propagation time between receivers at two or more positions. The recovered carrier is demodulated to obtain the data, which can then be used in conjunction with the pseudo-ranges from multiple satellites to determine the position of the receiver.

Effect of P code encryption

Use of the P-code to recover the L2 carrier is rendered more difficult by encryption of the P code before its modulation of the carrier. Because of this encryption, the received encrypted P-code does not match the locally generated P code, and locking onto the incoming signal is rendered practically impossible with a conventional GPS receiver. Since the L2 signal is modulated only with P code (and data), access to the L2 carrier by the conventional correlation approach therefore is virtually denied when the P code is encrypted. One solution to this problem is, instead of correlation, to square the received signal to obtain access to the L2 carrier. When a biphase-modulated carrier signal is multiplied by itself, the result is a signal of twice the carrier frequency, with all of the modulation removed. This is apparent from the trigonometric identity:

$$\cos 2x = 1 - 2\sin^2 x.$$

If one substitutes $x = 2\pi f_c t$, where $f_c$ is the carrier frequency, it will be seen that:

$$\sin^2 2\pi f_c t = \tfrac{1}{2}(1 - \cos 4\pi f_c t).$$

The result is the same regardless of whether or not the phase of the original carrier signal has been reversed by biphase modulation. Therefore, squaring provides a technique for recovering the original carrier signal without regard to the nature of any biphase modulation present on the received signal. The principal disadvantage of this approach is that the signal-to-noise ratio of the resultant carrier signal is substantially degraded.

The improvement.

In accordance with the invention, the incoming encrypted P-code GPS signal is not immediately squared as in the prior art. Instead, after mixing with a local oscillator signal to lower its frequency to an intermediate frequency, the encrypted P-code signal is correlated with a locally generated P-code signal. Since the locally generated P-code signal does not perfectly match the encrypted P-code sequence, the correlation does not produce a sharp peak in the frequency spectrum. However, the result of the correlation is filtered by a bandpass filter, and then the reduced-bandwidth signal is squared. The squared signal is then processed in a conventional tau-dither code loop or delay lock code loop to maximize the spectral peak that does occur. An error signal is generated and fed back to control the generation of the P-code signal in such a manner as to maximize the peak in the frequency spectrum of the output signal, and effectively lock onto the incoming L2 P code signal. Simultaneously, the second harmonic of the suppressed carrier signal, resulting from the squaring process, is processed to provide L2 carrier phase measurements.

Experimental basis for the invention

Figure 3:
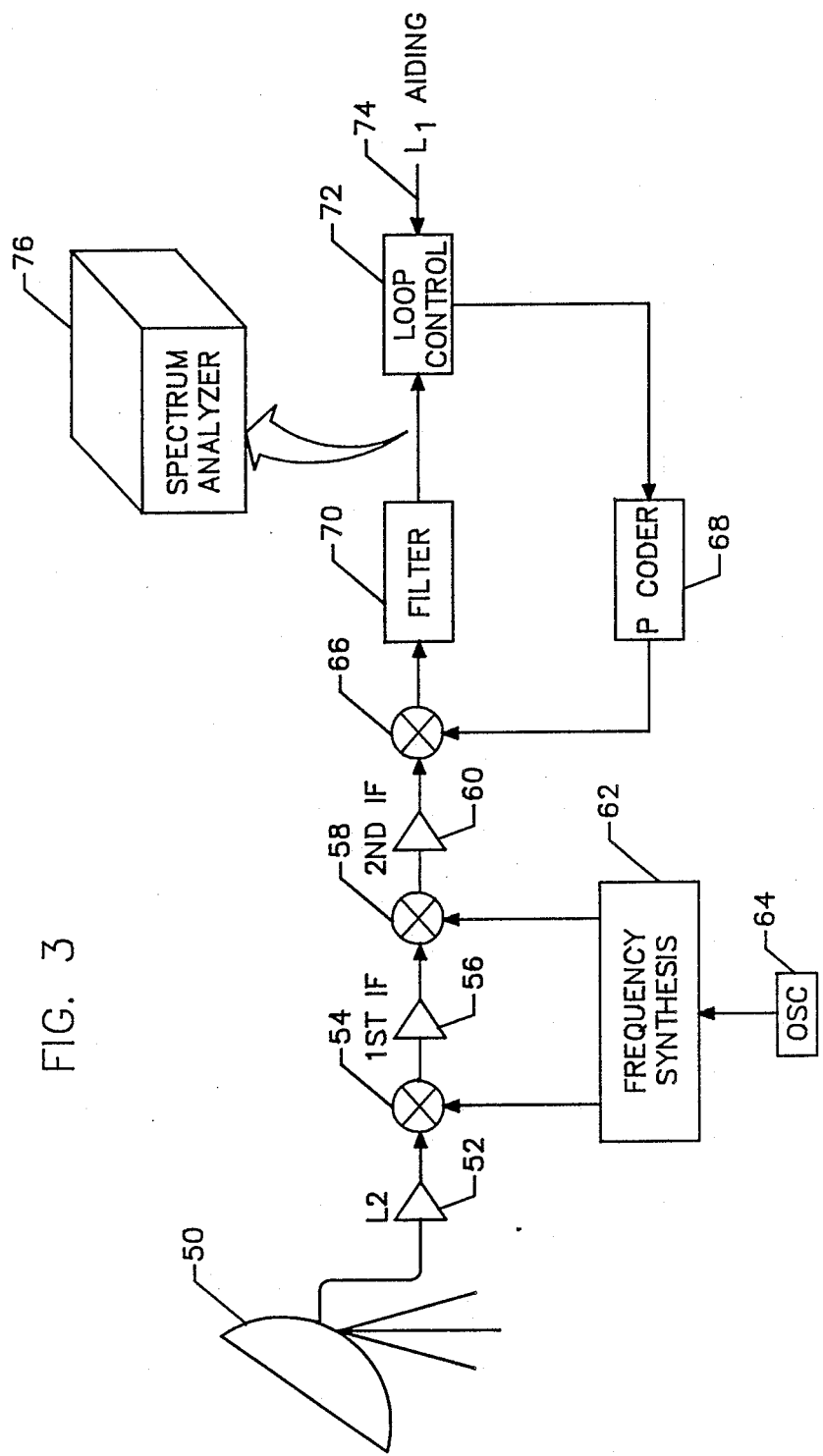
FIG. 3 is a block diagram of test apparatus used to analyze a GPS satellite signal with P code encryption.

The significant improvement that results by use of this technique instead of squaring the incoming signal in the entire P-code bandwidth, is derived from two characteristics of the P-code encryption, which may be observed by spectral analysis of the encrypted signals. FIG. 3 shows in block diagram form how a GPS receiver was connected experimentally to observe the principal characteristics of the encrypted P code. This receiver apparatus includes an antenna 50 and an associated preamplifier 52 through which an incoming signal is processed. For purposes of the experiment, the antenna 50 is a directional dish antenna pointed at a selected satellite. The signals are first processed by two intermediate-frequency stages, including a first mixer 54, a first IF amplifier 56, a second mixer 58 and a second IF amplifier 60. Locally generated oscillator signals are provided to the first and second mixers 54, 58 by a frequency synthesis circuit 62, which derives its frequency standard from an oscillator 64.

The output of the second IF amplifier 60 is connected to a correlator 66, a second input of which is derived from a P code generator 68, which generates a replica of the P code for the satellite being tracked. The output of the correlator 66 passes through a filter 70 to a loop control circuit 72, the principal purpose of which is to provide control signals to the P code generator 68, to maximize the spectral peak in the correlator output. As indicated at 74, the loop control circuit is aided by timing signals obtained as a result of conventional correlation of the C/A code in the L1 GPS signal. A spectrum analyzer 76 is attached to various points in the receiver test system, to observe the nature of the encrypted P code signals.

Figure 4:
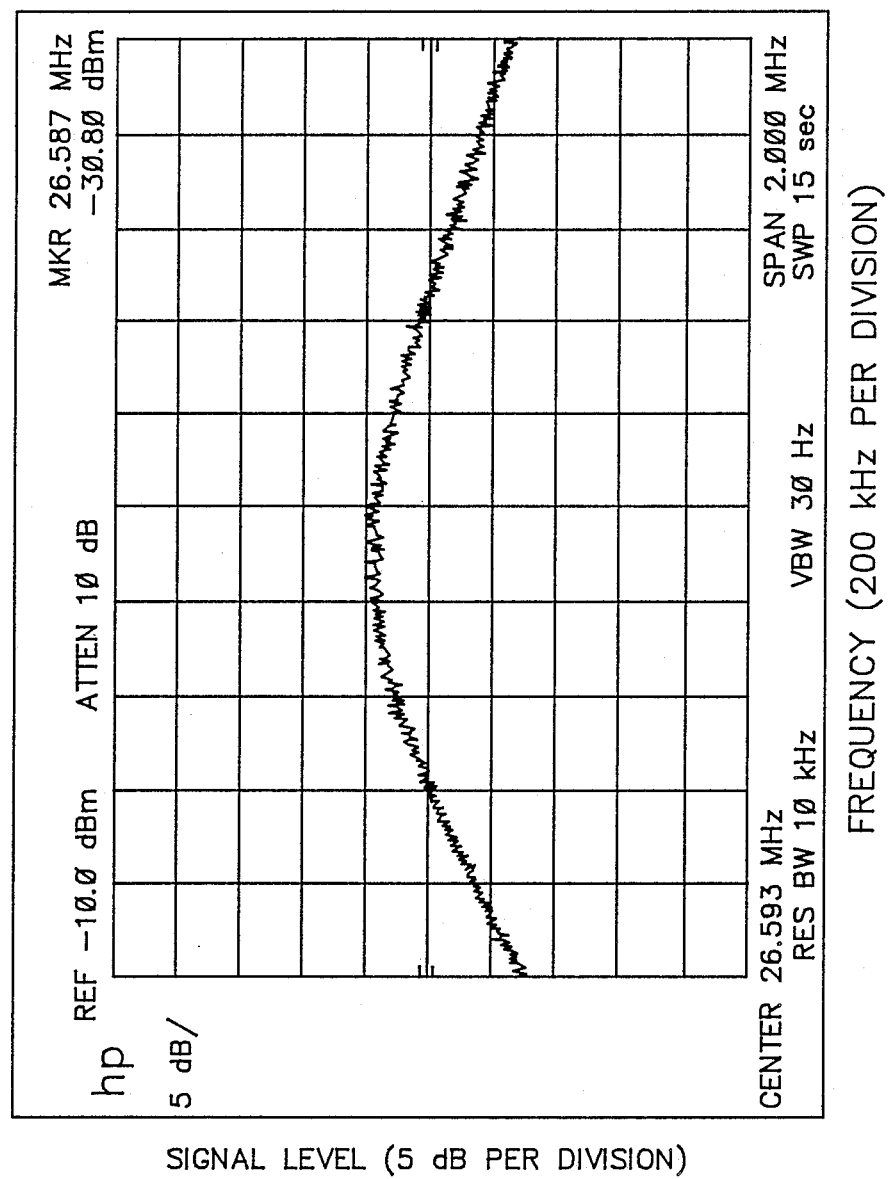
FIG. 4 is a graph showing the noise response of a filter shown in FIG. 3.

FIGS. 4–7 show some of the test results that were derived from the apparatus of FIG. 3. First, FIG. 4 gives the noise response of the filter 70. The output signal level, expressed in dB, is plotted against frequency, for an input signal consisting of broadband noise. For this figure and for FIGS. 5–7, the center frequency of the filter is 26.593 MHz, the frequency scale is 200 kHz per division, and the output signal level scale is 5 dB per division.

Figure 5:
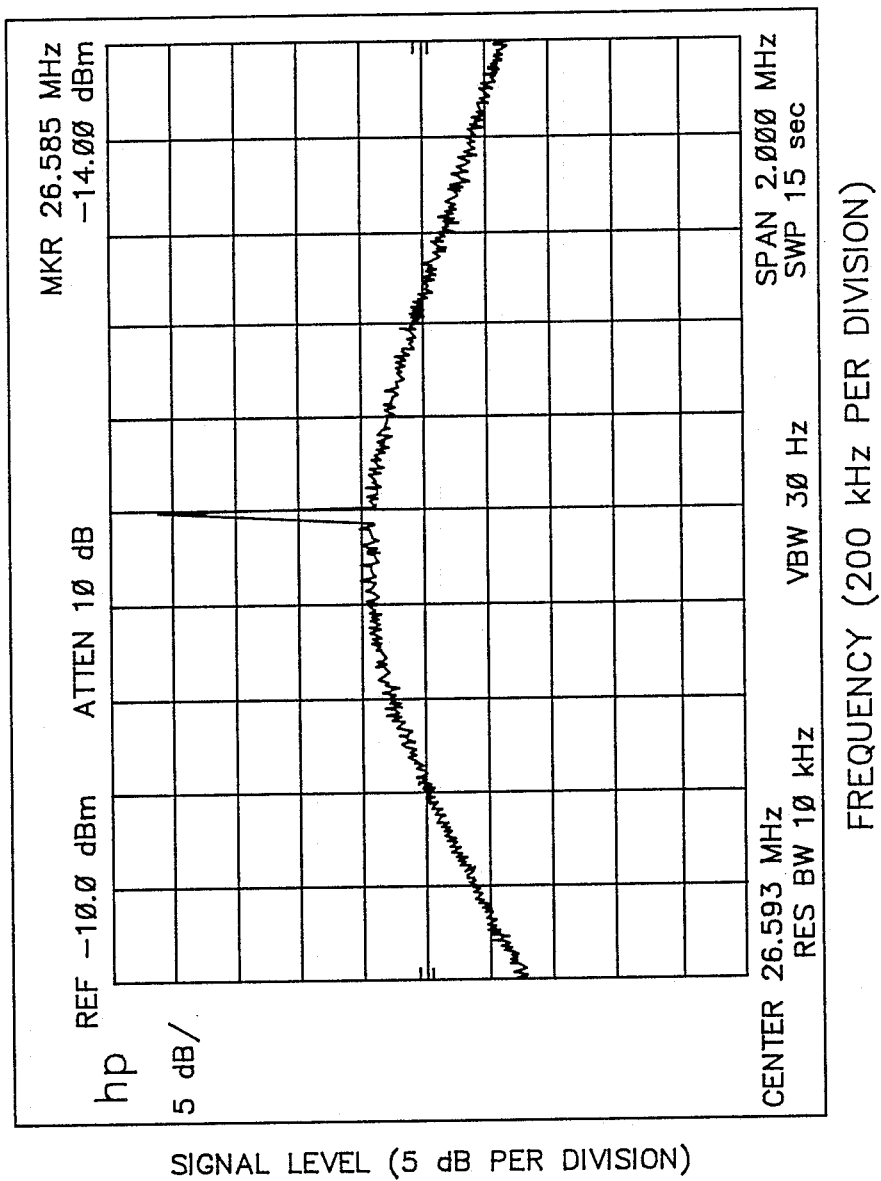
FIG. 5 is a graph showing the output of the filter in FIG. 3 when the test apparatus is receiving an unencrypted P code signal and correlating it with a locally generated P code.
Figure 6:
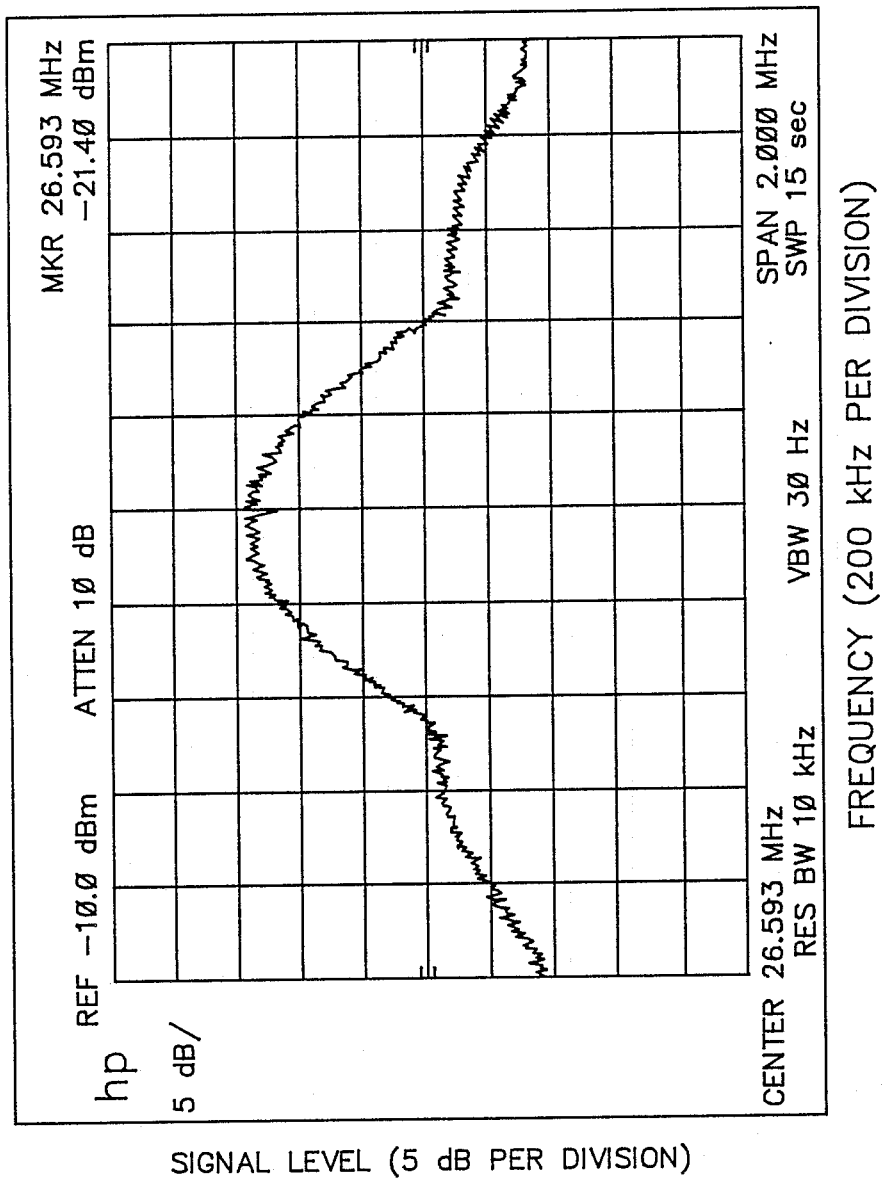
FIG. 6 is a graph similar to FIG. 5, but showing the filter output when the apparatus is receiving an encrypted P code signal.
Figure 7:
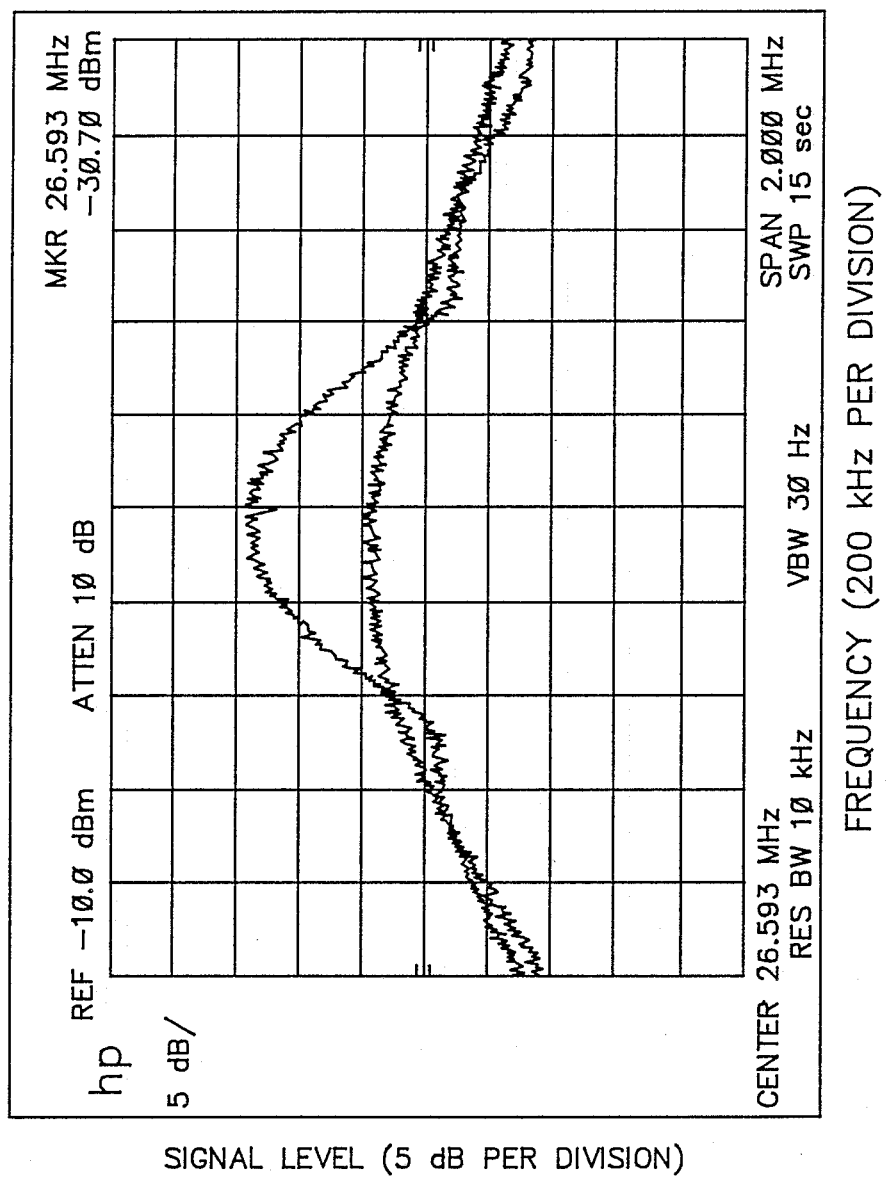
FIG. 7 is a graph combining FIGS. 5 and 6 into one figure.

FIG. 5 shows the output of the filter 70 when the antenna is receiving an unencrypted P code and the P-code correlation process is operating as intended. The central peak in the spectral output of the filter is indicative of the carrier signal. FIG. 6 shows the filter output when the P code is encrypted. The correlation process in this case can only produce a very indistinct spectral peak. FIG. 7 is a composite of FIGS. 4 and 6, and shows the characteristic $[(\sin x)/x]^2$ shape of the imperfectly correlated P code signal.

Two important characteristics of the encrypted P code are apparent from FIG. 7. First, the encryption is actually an additive code superimposed on the P code; and second the bandwidth of the encryption is significantly less than the bandwidth of the P code itself. The spectrum of the encryption appears to be of the form $(\sin x)/x$, with first nulls located at +500 kHz and −500 kHz. The present invention makes use of these characteristics to derive the L2 carrier signal with significantly enhanced signal-to-noise ratio.

Description of the improvement

Figure 8:
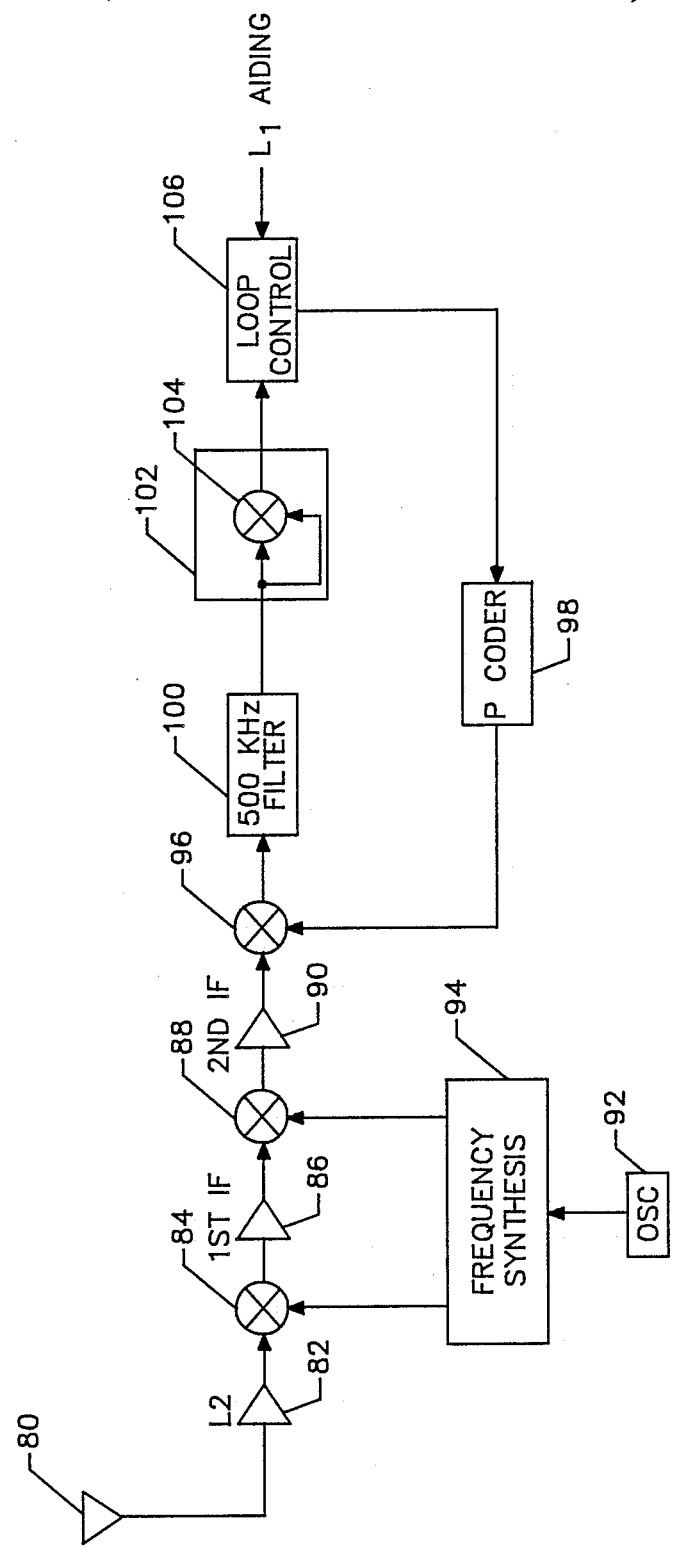
FIG. 8 is a simplified block diagram of a receiver system configured in accordance with the present invention.

FIG. 8 shows in block diagram form how the incoming GPS signal is processed in accordance with the present invention. The receiver of the invention includes an antenna 80 and an associated preamplifier 82 through which the incoming signal is processed. Also included are a first intermediate-frequency (IF) mixer 84, an associated IF amplifier 86, a second IF mixer 88, an associated IF amplifier 90, a reference oscillator 92, and frequency synthesis circuitry 94 to generate local oscillator signals at various frequencies derived from the reference oscillator signal. Input signals received by the antenna 80 are down-converted to lower frequencies by the conventional IF mixers 84, 88, and then input to a correlator 96. Also input to the correlator are signals generated in a P code generator 98. The signals resulting from the correlation process are input to a filter 100, which, in the presently preferred embodiment of the invention, has a pass bandwidth of 500 kHz, consistent with the spectral analysis shown in FIG. 7. Output signals from the filter 100 are input to a squaring circuit 102. The squaring function may be performed by a conventional mixer circuit 104, wherein the input signal is mixed with, i.e. multiplied by, itself, or may be performed to a close approximation by a full-wave rectifier circuit. The output of the squaring circuit is input to loop control circuitry 106 for detection of carrier phase and generation of appropriate control signals fed back to the P code generator 98.

Other aspects of the receiver are conventional and not shown in FIG. 8. The incoming L1 signal must be completely demodulated to derive the 50-hertz data signal that was originally modulated onto both the L1 and the L2 signals. Then this data and the timing signals derived from analyzing the incoming L1 and L2 signals are processed to derive the position of the receiver. In survey applications, two or more receivers generate carrier phase measurements simultaneously, for output to a recording medium for subsequent computer processing.

The principal advantage of the invention becomes apparent from a simple analysis of the signal-to-noise ratios. Table 1 provides a comparison between the results obtained by simply squaring the incoming L2 signal over the entire 10 MHz bandwidth of the P code, and corresponding results obtained by correlating, filtering and squaring over a much smaller bandwidth. In both cases, a typical good signal-to-noise ratio, or carrier-to-noise ratio C/No, is assumed to be 40 dB/Hz, i.e. 40 dB measured over a one-hertz bandwidth. This figure is derived from an assumption of a typical noise power of $-170$ dBm/Hz, that is to say 170 dB below one milliwatt, measured over a one-hertz bandwidth, and a typical good GPS power of $-130$ dBm.

TABLE 1

| Squaring Bandwidth | 10 MHz | 500 kHz |
|---|---|---|
| Typical good C/No | +40 dB/Hz | +40 dB/Hz |
| Change to squaring bandwidth | −70 dB | −57 dB |
| S/N in squaring bandwidth | −30 dB | −17 dB |
| S/N of squared signal | −60 dB | −34 dB |
| Implementation loss | −3 dB | −3 dB |
| Final S/N of squared signal | −63 dB | −37 dB |
| Return to 1 Hz bandwidth | +70 dB | +57 dB |
| Squared signal C/No | +7 dB/Hz | +20 dB/Hz |

As is well known, the decibel measures a power ratio of two signals, and is defined as ten times the common or base-ten logarithm of the power ratio. Thus, for example, a power ratio of 10,000 is expressed as $10 \log_{10} 10,000 = 40$ dB. The unit dBm measures a power with respect to a one-milliwatt reference level. For example, a 40 dBm signal is equivalent to 10,000 mW or 10 watts in power, and a $-40$ dBm signal is equivalent to 0.0001 mW in power. When the powers of two signals are expressed in dBm, their ratio in dB is computed from the difference of the dBm values. Therefore, if the signal power is $-130$ dBm/Hz and the noise power is $-170$ dBm/Hz, then the signal to noise ratio is $-130 - (-170)$ dB/Hz, or 40 dB/Hz.

If the GPS signal is to be squared over the entire bandwidth of the P code of approximately 10 MHz, the noise power increases by a factor of $10^7$ or 70 dB, and the signal-to-noise ratio in the squaring bandwidth is therefore $40 - 70 = -30$ dB. Squaring has the effect of squaring the signal-to-noise ratio, or doubling the ratio expressed in dB. Thus the ratio after squaring is $-60$ dB. A further 3 dB is lost as a result of the noise signal being multiplied by itself, giving a final signal-to-noise ratio of $-63$ dB in the squaring bandwidth. Expressed in terms of a 1 Hz bandwidth, the squared signal has a signal-to-noise ratio of $-63 + 70 = +7$ dB.

The corresponding figures for a squaring bandwidth of 500 kHz point out the principal advantage of the invention. The typical signal-to-noise ratio of 40 dB is first reduced by 57 dB when expressed over the squaring bandwidth. ($10 \log_{10}(500,000)$ 57.) Therefore, the signal-to-noise ratio in the squaring bandwidth is $40 - 57 = -17$ dB. After squaring, the final signal-to-noise ratio is $2(-17) - 3 = -37$ dB, and after conversion to a one-hertz bandwidth the squared signal-to-noise ratio is $-37 + 57 + 20$ dB. Therefore, the improvement in signal-to-noise ratio resulting from the invention is $+13$ dB, a factor of approximately twenty, which is the ratio of the two squaring bandwidths.

Figure 8A:
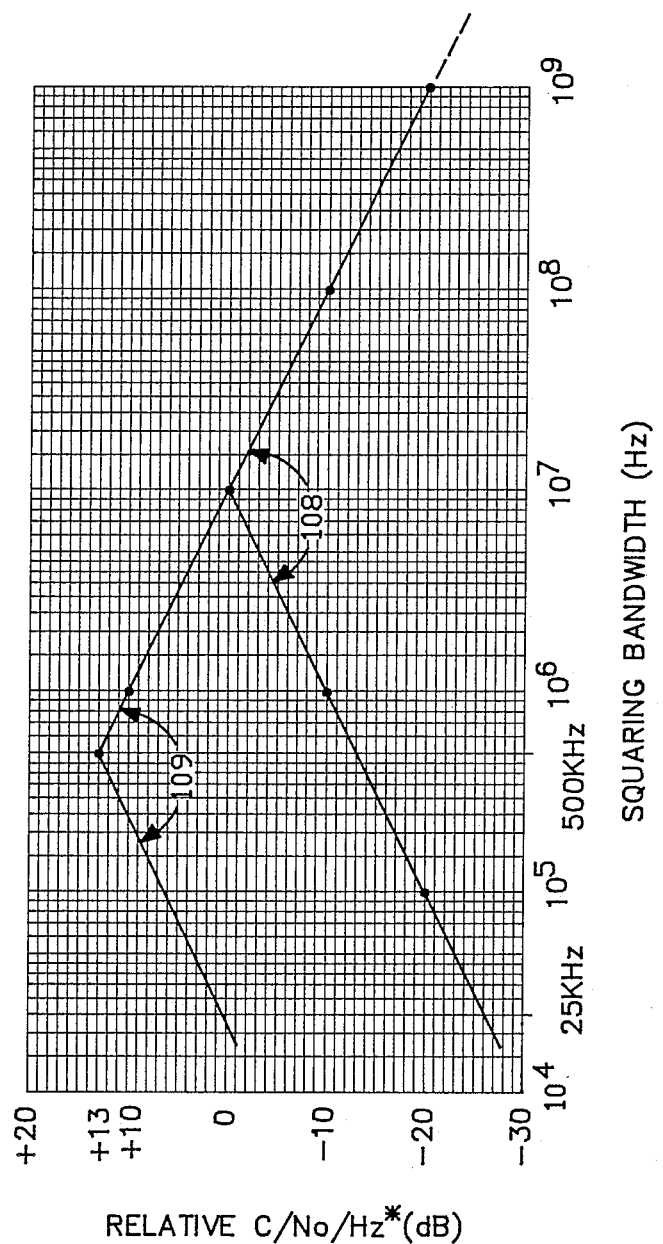

FIG. 8a shows the variation of squared signal C/No ratios, expressed in terms of a one-hertz bandwidth, with the squaring bandwidth selected. When squaring a $[(\sin x)/x]^2$ signal, the best performance (maximum C/No ratio) is obtained by squaring over a bandwidth defined by $\pm f_{null}/2$, where $\pm f_{null}$ are the frequencies at the primary null points in the spectral distribution of the signal. Prior to processing by the correlator 96 (FIG. 8), the primary null points are located at approximately $\pm 10$ MHz, derived from the 10.23 MHz clock rate for the P code, and the signal-to-noise performance is maximized when squaring is performed over a bandwidth of approximately $\pm 5$ MHz, i.e. over a total bandwidth of approximately 10 MHz. As indicated by the curve 108 in FIG. 8b, the C/No ratio falls off for squaring bandwidths either greater than or less than the 10 MHz value. The corresponding variation in C/No ratio for apparatus of the invention is shown at 109 in FIG. 8a. After correlation with the locally generated P code, the null points of the resulting frequency distribution are, as shown in FIG. 7, located at approximately $\pm 500$ kHz. Therefore, the point of maximized C/No ratio is obtained from a squaring bandwidth of $\pm 250$ kHz, i.e. over a total bandwidth of 500 kHz.

In general terms, the best squaring bandwidth is $\pm f_{null}/2$, where $\pm f_{null}$ are the primary null point frequencies in the frequency distribution after correlation of the incoming encrypted P code with the locally generated P code. It will be observed from FIG. 8a that the use of any squaring bandwidth between about 25 kHz and about 10 MHz will provide a C/No ratio improvement over the best ratio obtainable by squaring the signal without correlation.

The method and apparatus of the present invention may be incorporated into practically any GPS receiver that needs L2 measurements for position determination or baseline measurement. The specific details of implementation will depend largely on the design of the receiver. Although these details may differ from one receiver to another, the concept of squaring the L2 signal only after correlation and bandpass filtering, will be equally applicable. By way of example, the invention is presently implemented in a Model WM 102 GPS surveying system, manufactured by WM Satellite Survey Company, which is a joint venture of Wild Leitz Ltd., 9435 Heerbrugg, Switzerland, and Magnavox Survey Systems, Inc., Torrance, Calif. The design of the Model WM 102 system will now be discussed in some detail, although it will be understood that the invention is not limited to this receiver system.

Description of illustrative receiver

FIG. 9 is a system block diagram of the receiver, including an antenna assembly 110, a line amplifier assembly 112, and a receiver assembly 114. The antenna assembly 110 includes an antenna 116 and a preamplifier module 118. The antenna 116 presently employed is a microstrip patch antenna manufactured by Ball Brothers of Bloomfield, Colo., and designated part number AN111. The line amplifier assembly 112 is optionally used when the distance from the antenna to the receiver is large. The receiver assembly 114 includes a power supply module 120, with provision for an internal battery pack 122 and connections 124 for externally provided power, a downconverter module 126, a reference oscillator 128, a six-channel L1 receiver module 130, and an L1/L2 receiver module 132. Also included are a central processor unit (CPU) module 134, a keyboard assembly 136, a standby module 138, a display module 140, an input/output (I/0) module 142, and a tape cassette deck 144.

The downconverter module 126 converts the incoming L1 and L2 signals to an intermediate frequency and passes the IF signals on to the six-channel L1 receiver module 130 and the L1/L2 receiver module 132. The CPU module 134 controls the receiver modules 130, 132 and the downconverter module 126, and directs operation of the system to derive measurements from up to six transmitting satellites at a time. The six-channel L1 receiver 130 tracks up to six separate L1 signals in parallel, and derives C/A code, data and carrier phase information from the L1 signals. The L1/L2 receiver 132 is time-shared or multiplexed among the satellites being tracked on L1. This module derives accurate L2 carrier phase measurements and uses the technique of the invention to obtain these measurements with a significantly improved signal-to-noise ratio. All of the derived measurements are transmitted through the I/O module 142 to the cassette deck 144, to be recorded on tape cassettes for eventual post-processing in a separate computer system (not shown). The I/O module 142 has additional output connections, indicated at 146, for transmission of accumulated data directly to a computer rather than to a tape cassette.

Figure 10A:
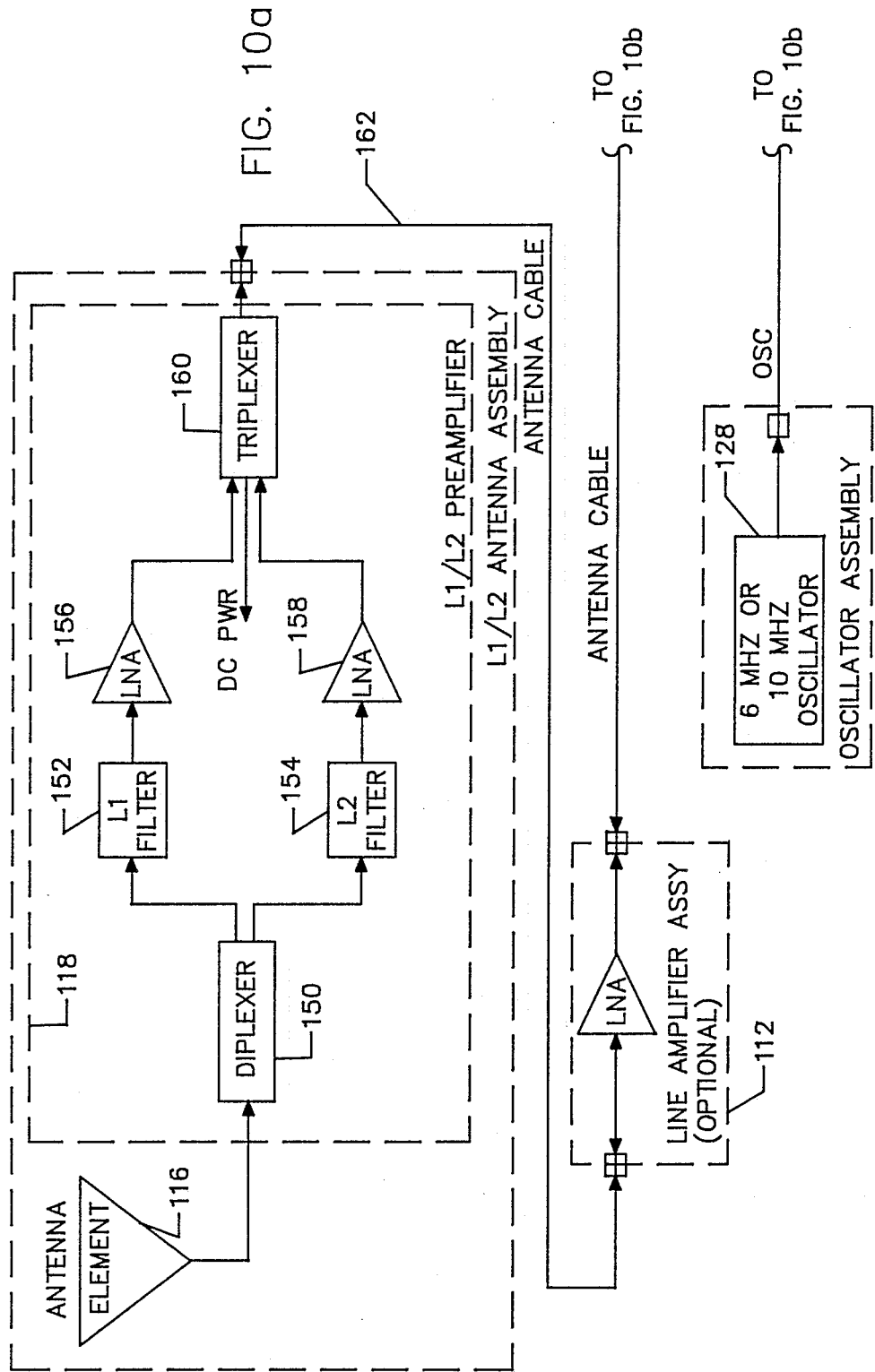
FIG. 10A and 10B block diagrams of a portion of the receiver system, showing more detail of the antenna assembly and the L1/L2 downconverter assembly.
Figure 10B:
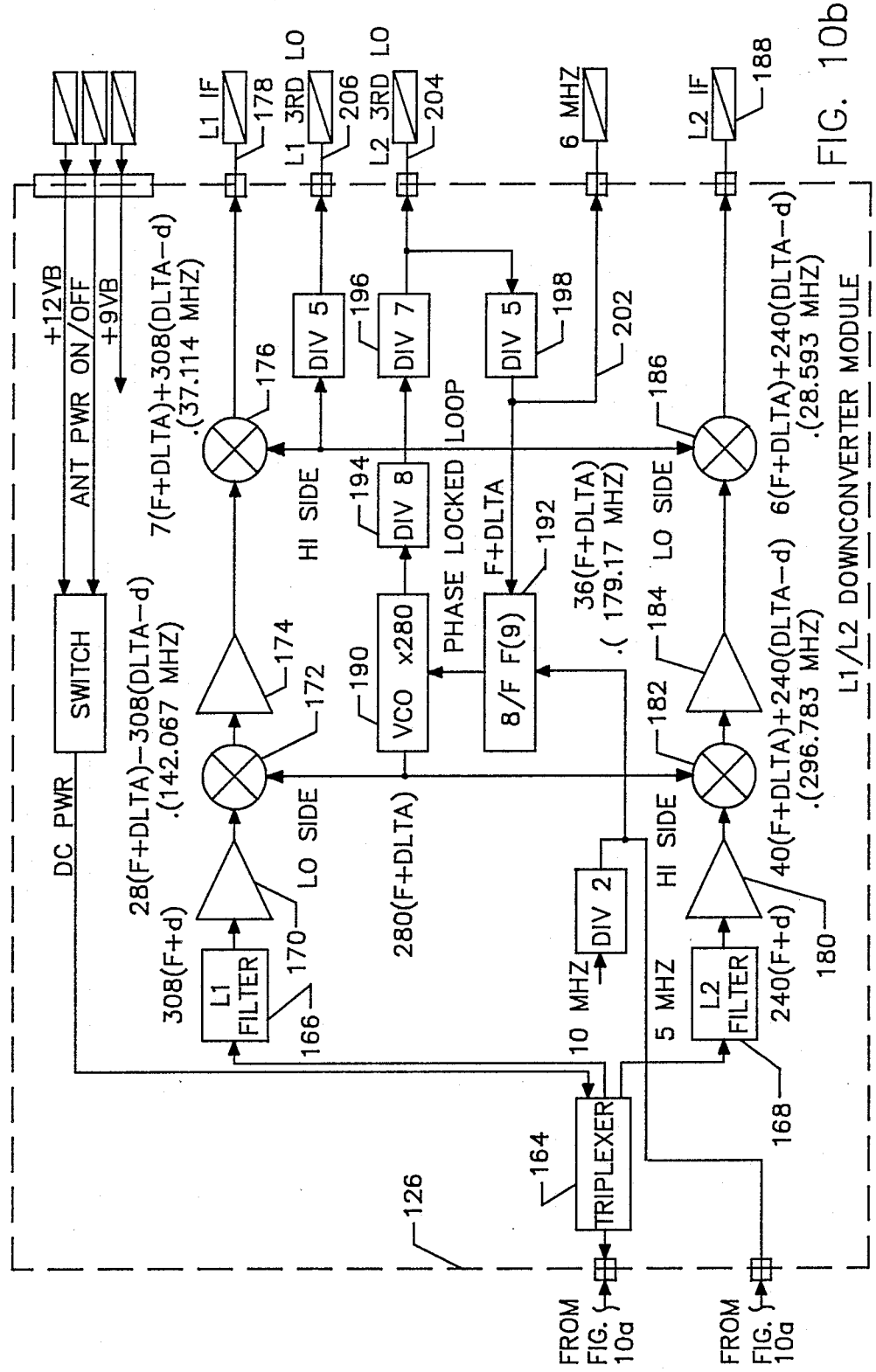

FIG. 10 shows the antenna assembly 110 and the L1/L2 downconverter assembly 126 in more detail. The antenna preamplifier module 118 includes a diplexer 150 that connects the antenna 116 alternately to an L1 filter 152 and an L2 filter 154. The outputs of these filters are connected to separate line amplifiers 156, 158, and the line amplifier outputs are connected as inputs to a triplexer 160, the output of which is connected to an antenna cable 162 leading to the L1/L2 downconverter module 126.

The L1/L2 downconverter module includes another triplexer 164 connected to the antenna cable 162, two of the outputs of which are connected to an L1 filter 166 and an L2 filter 168. The third path through the triplexers 164, 160 is used for transmission of power signals to the antenna assembly 110. The L1 signals are processed by a first L1 amplifier 170, a first L1 mixer 172, a second L1 amplifier 174 and a second L1 mixer 176, which outputs an L1 IF signal on line 178. Similarly, the L2 signals are processed by a first L2 amplifier 180, a first L2 mixer 182, a second L2 amplifier 184 and a second L2 mixer 186, which outputs an L2 IF signal on line 188.

The downconverter module 126 is controlled by a phase locked loop comprising a voltage-controlled oscillator (VCO) 190, a phase-frequency detector 192, and three frequency divider circuits 194, 196, 198. A reference frequency of nominally 5 MHz is input to the phase-frequency detector 192, which generates a control signal on line 200 to the VCO 190, the output of which is connected as inputs to the first L1 mixer 172 and the first L2 mixer 182. The VCO output is also connected through divider 194 to the second L1 and L2 mixers 176, 186. After further division by dividers 196 and 198, the VCO output is fed back to the phase-frequency detector 192, which also incorporates a loop filtering function. The circuit operates in the conventional manner of a phase locked loop to produce various local oscillator signals that are synchronized with the reference oscillator and used to downconvert the incoming L1 and L2 signal. A nominal 5 MHz signal is produced on line 202 from frequency divider 198, and L2 local oscillator signal is produced on line 204 from divider 196, and an L1 local oscillator signal is produced on line 206 from another divider 108.

Figure 11:
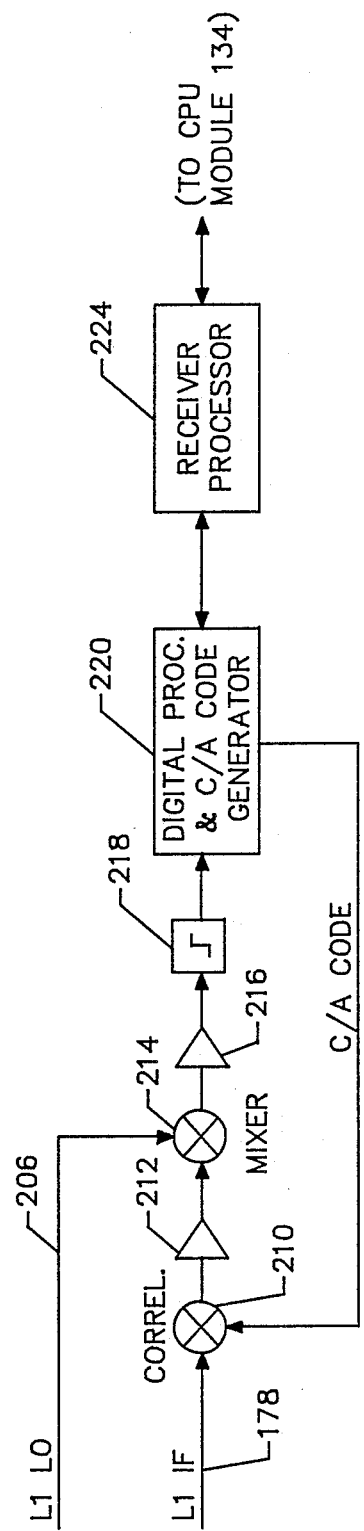
FIG. 11 is a block diagram of one of six L1 receiver modules in the receiver system of FIG. 9.

FIG. 11 is a block diagram of one of the six L1 channels in the receiver. This shows tracking of the L1 signal using conventional correlation with a locally generated C/A code. This part of the receiver includes a correlator 210, and first amplifier 212, a mixer 214, and a second amplifier 216. The correlator 210 receives L1 IF signals on line 178 and the correlator output is amplified in the first amplifier 212, and then mixed down to a lower frequency in the mixer 214, which outputs a recovered L1 signal at a frequency of approximately 1.2797 MHz. The second amplifier 216 also provides a peak-limiting function, as indicated by block 218, to produce a square-wave output from signals that have taken a basically sinusoidal form up to this point. The square-wave signals are thereafter processed in digital processing circuitry 220, which also generates the C/A code, on line 222 connected as an input to the correlator 210. The digital processing circuitry 220 is controlled by a receiver processor 224, which performs conventional code and carrier tracking functions for the purpose of synchronizing the locally generated code and carrier signals. The receiver processor 224 is coupled to the CPU module 134 (FIG. 9).

The L1 signal is recovered and tracked by the correlation loop shown in FIG. 11, using conventional receiver techniques. Loop control to adjust the timing of the C/A code generator can use any conventional technique, such as delay lock or early-late processing of the code. Once the L1 signal is being tracked by the control loop in the receiver processor 224, all of the L1 information can be derived from the received signal, including the encoded data and the precise phase of the L1 carrier signal.

It will be understood that a large number of receiver designs are possible implementations. In the receiver module described above, correlation and mixing are performed in analog circuitry, and then digital processing is performed on the recovered L1 signal. It will be apparent to those skilled in the art of spreadspectrum receiver design that other functions may also be performed in a digital rather than analog mode, and that these distinctions are largely a matter of design choice. There is also a design trade-off between hardware and software implementation of the receiver. In the illustrative receiver, the digital processing circuitry 220 is implemented in the form of hard-wired circuitry and the receiver processor 224 takes the form of a programmable processor in which the functions performed are defined by software or "firmware." Again, these are matters of design choice and do not affect the overall function of the receiver.

As noted earlier, there are six independent L1 receiver channels like the one shown in FIG. 1. The digital processing circuitry 220 may be shared by two or more of the channels, depending on the specifics of the design adopted. Each L1 channel receives signals from a single satellite, as directed by the CPU module, which has access to almanac data transmitted by the satellites and containing the positions of all of the satellites. Thus, based on an approximate receiver location, the CPU module 134 can determine which satellites should be in view, and can set up each L1 channel to receive from a selected satellite by instructing the channel which C/A code sequence to generate. If the receiver position is not known, the CPU module 134 may have to perform a scanning operation in which multiple C/A code sequences are generated in turn.

Figure 12:
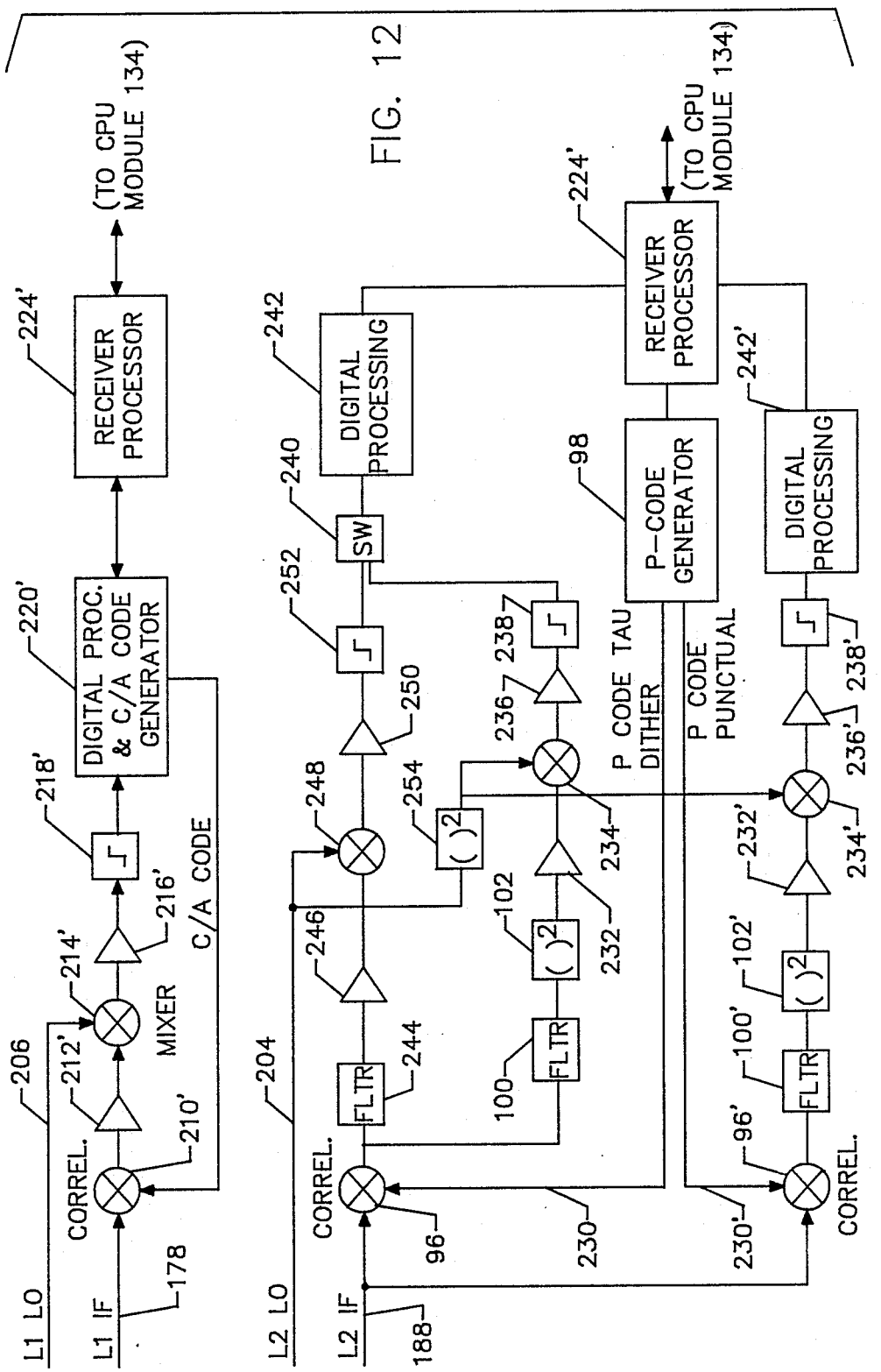
FIG. 12 is a block diagram of the L1/L2 receiver module of the receiver system of FIG. 9.

In addition to the six L1 channels contained in L1 receiver module 130 (FIG. 9), the receiver includes the separate L1/L2 receiver module 132 (FIG. 9), which will now be described in more detail with reference to FIG. 12. The L1 portion of this module is identical to one of the six L1 receiver channels described with reference to FIG. It includes a correlator 210', a first amplifier 212', a mixer 214', a second amplifier 216', a peak limiter 218', digital processing circuitry including a C/A code generator 220', and a receiver processor 224'. Unlike the six L1 channels, however, the L1/L2 receiver module is switched or multiplexed from satellite to satellite in a cyclic manner, under control of the CPU module 134 (FIG. 9). This time-sharing of the L1/L2 receiver module is merely a design choice, however. The system could just as easily have been designed, although at greater cost, to include six L1/L2 channels. From the standpoint of explanation of its operation, time-sharing of the L1/L2 receiver module may be ignored completely.

The L2 channel in the L1/L2 receiver module contains multiple paths, as will now be described. Some of these components have already been identified with reference to FIG. 8. The L2 IF signal received on line 188 is input to the correlator 96, the other input of which is derived from the P code generator 98, over line 230. The output of the correlator 96 is connected to the bandpass filter 100, and from there to the squaring circuit 102. After squaring, the correlator output is amplified in amplifier 232, downconverted to a lower frequency in a mixer 234, amplified in amplifier 236, and hard-limited, i.e. amplitude-limited in limiter 238. The resultant signals pass through a switch 240 and into digital processing circuitry 242, under the control of the receiver processor 224'.

A parallel signal path from the correlator 96 is used when the P code is not encrypted, and performs a conventional correlation of the P code. This parallel path includes a filter 244, an amplifier 246, a mixer 248, a second amplifier 250, and a limiter 252. The correlator output along this path is downconverted by the mixer 248, which has the L2 local oscillator signal as its other input on line 204, and provides a second input to the switch 242. When the P code is not encrypted, this parallel path performs correlation using the P code and recovers the L2 carrier signal in a conventional manner. When the P code is encrypted, the switch 240 is controlled to select signals from the lower parallel path, in which the L2 signal is recovered by squaring over a relatively narrow bandwidth defined by the filter 100. In the downconverting process performed by mixer 234, the local oscillator L2 signal on line 204 is first squared, in another squaring circuit 254, before application to the mixer 234, consistent with the squaring of the correlated L2 signal before input to the other terminal of the mixer. The L2 carrier signal derived from the path through the filter 100 and squaring circuit 102 is similar to the one derived from conventional correlation, using the upper parallel path, except that the L2 signal derived by squaring is at twice the frequency of the conventionally derived signal. Therefore, when P code encryption is in effect, the L2 signal derived by this apparatus must be compared to a phase reference at twice the carrier frequency in the digital processing circuitry 342.

The control loop 106 (FIG. 8), as previously described, controls the P code generator 98 in such a way as to lock the P code generator onto the P code in the incoming signal, and thereby maximize the spectral peak in the output from the correlator 96. The technique used in this receiver is a conventional one known as tau dithering. The locally generated P code is alternately advanced and retarded by some increment of time equivalent to a fractional portion of a "chip," such as one half, on each side of a neutral position. If the local P code is being generated exactly in synchronism with the incoming P code, the dithered P code signals will produce correlator outputs that are identical. If the correlator outputs corresponding to the "advanced P code" and "retarded P code" signals are different, then the neutral timing of the local P code is not properly in synchronism. Therefore, the difference between the correlator outputs for the advanced and retarded local P codes can be used to generate a correction signal to advance or retard the neutral position of the local P code generator.

The P code generated on line 230 is the alternately advanced and retarded P code. The P code generator 98 also generates, on line 230', a "punctual" P code. This is connected as an input to another correlator 96' receiving the L2 IF signal on line 188. A further branch of the L1/L2 receiver module is formed by the correlator 96', connected in series to a bandpass filter 100', a squaring circuit 102', an amplifier 232', a mixer 234', another amplifier 236', a limiter 238', and digital processing circuitry 242'. The purpose of an additional parallel path including the functions correlation, filtering and squaring, is to satisfy the requirements of the particular loop control technique used, namely tau dithering, which produces a signal with an average of 2.5−3.0 dB less amplitude. It will be understood that different implementations are possible within the scope of the invention, some of which may not need such a second parallel path.

The only other function of the receiver not yet discussed in detail is that relating to "L1 aiding" of the control loop that recovers the L2 carrier signal. It is well known that there are many sources of phase and frequency shift of the received signal, e.g., satellite motion, receiver motion, oscillator frequency drift, tropospheric refraction, and ionospheric refraction. Except for ionospheric refraction, all such sources cause phase and frequency shifts which are strictly proportional to the carrier frequencies; in this case L1 and L2. Because of this proportionality, it is possible to "aid" the tracking of the weaker L2 signal with information obtained from tracking the stronger L1 signal. In the receiver described above, the L1 signals are received, correlated and tracked in a conventional manner, and the receiver therefore has an extremely accurate record of the phase and frequency of the L1 carrier. It will be recalled that L1 and L2 are transmitted coherently, i.e. in a known phase relationship. The only factor that affects the phase of L2 differently from L1 is ionospheric distortion, and this is known to be a relatively slowly varying phenomenon. Therefore, tracking of L2 becomes much less difficult if one makes use of the already known phase and frequency of L1. This is known as "L1 aiding" of the L2 control loop.

The implementation of L1 aiding in the present receiver involves first multiplying the frequency of the known L1 carrier by a factor of 60/77, the ratio of the frequencies of L2 and L1, and then computing the difference between the received L2 signal and the L1*60/77 signal. In effect, the L2 tracking function is reduced to a simpler problem of tracking the difference signal between L2 and L1*60/77. Basically, a change in phase angle of the L1*60/77 signal is accumulated and continually compared with the phase of the received L2 signal. Differences are used by the CPU module 134 (FIG. 9) to update L2 phase readings. It will be understood that other, mathematically equivalent techniques to the one described may be used to achieve the same result.

Summary of Principles of Operation

The technique of the present invention provides an improved signal-to-noise ratio when recovering the L2 carrier signal from GPS signals in which the P code has been encrypted. The signal-to-noise ratio improvement due to the invention is approximately 13 dB, or a factor of twenty in signal power, when compared with the alternative approach of squaring the L2 received signal across the entire bandwidth of the P code. The improvement in signal-to-noise ratio ensures higher reliability of data received especially under degraded conditions and therefore ensures greater reliability that baseline readings will be obtained to useful survey accuracy. Also, better signal-to-noise ratios can permit higher accuracy survey results in a shorter time. An important advantage advantage of this speed increase is that a single receiver channel can be used in a multiplexed or sequential manner to process signals from multiple satellites. This represents a substantial reduction in the size and cost of the receiver hardware. Another advantage of the invention is that recovery of the P code can be used to identify and separate signals from multiple satellites. Also, without use of P code the equipment might have to rely on detection of differences in Doppler frequency shifts to identify the satellites, a technique that is inherently subject to periods of ambiguity when Doppler frequencies of two satellites cross each other.

In a receiver employing the invention, L1 signals are processed by conventionally correlating with a locally generated C/A code, to recover the phase of the L1 carrier signal, together with all of the data encoded onto the carrier. If the P code is encrypted, the L2 carrier signal is recovered by squaring the incoming signal, but only after correlation with a locally generated P code, and filtering to a bandwidth of approximately 500 kHz for maximum advantage. Varying degrees of improvement in signal-to-noise ratio are obtained over filter bandwidths between 25 kHz and 10 MHz. Tracking of the L2 carrier is facilitated by using the already accurately tracked L1 signal to aid in the tracking of L2. If the P code is not encrypted, L2 may be recovered using conventional correlation.

Conclusion

As will now be apparent, the technique of the invention allows users of GPS to benefit from recovery of the L2 carrier signal phase with better signal-to-noise ratio, to separate satellite signals, and to obtain measurements of L2 pseudo-ranges, even though the P code signals are encrypted prior to transmission. However, it should be noted that this technique does not in any way circumvent the intended purpose of P-code encryption. Encryption is intended as an "antispoofing" measure. One of the principal concerns of those responsible for administering GPS is that someone may generate bogus satellite signals that have the proper format of GPS signals, but because they emanate from some other location and may also contain other false data, these signals would "spoof" military users of the system into deriving false position information. Encryption of the P-code signals effectively prevents this type of unauthorized activity. The present invention provides a technique by which nonmilitary users of the system may still derive satisfactory use of both L1 and L2 carrier signals, but without frustrating the "antispoofing" effect of the encryption. The invention permits passive users of the system to achieve improved survey equipment performance when P code encryption is enabled, but the invention does not decrypt the P-code signals, and is of no help to anyone seeking to generate bogus P-code signals.

It will be appreciated from the foregoing that the present invention represents a significant advance in the field of GPS signal processing. In particular, the invention provides a technique for deriving P code pseudo-range and more accurate carrier phase information from incoming GPS signals received from satellites, even though the P-code signals have been encrypted as an "antispoofing" measure. Moreover, the invention derives the benefit of the P-code and L2 carrier signals without detracting from the "antispoofing" effect of encryption. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. A method of processing received signals in a global positioning system (GPS), to recover an L2 carrier signal that has been modulated with an encrypted P-code signal, the method comprising the steps of:

receiving a signal transmitted from each of a plurality of satellites, the signal containing an encrypted version of a pseudorandom code sequence known as P code;

independently generating a replica of the P-code pseudorandom code sequence without encryption;

correlating the received encrypted P-code sequence with the locally generated replica of the P-code sequence, to obtain a frequency spectrum containing a peak indicative of the timing relationship between the received encrypted P code sequence and the locally generated P code sequence;

bandpass filtering the result of the correlation step; and squaring the correlated and filtered signal to recover the L2 carrier signal with a favorable signal-to-noise ratio.

2. A method as defined in claim 1, and further including the step of:

controlling the step of generating a replica of the P-code sequence, to maximize the peak in the frequency spectrum.

3. A method as defined in claim 2, wherein:

the step of controlling generation of a replica of the P-code sequence includes obtaining timing information indicative of a pseudo-range for a satellite.

4. A method as defined in claim 1, wherein:

the step of bandpass filtering the result of the correlating step is performed with a bandwidth of approximately $\pm f_{null}/2$ centered in the frequency spectrum obtained from the correlating step, where $\pm f_{null}$ define the positions of primary null points in the frequency spectrum.

5. A method as defined in claim 1, wherein:

the step of bandpass filtering the result of the correlating step is performed with a bandwidth less than about 10 megahertz and more than about 25 kilohertz.

6. A method as defined in claim 1, wherein:

the step of bandpass filtering the result of the correlating step is performed with a bandwidth of approximately 500 kilohertz.

7. A method as defined in claim 2, and further comprising:

recovering an L1 carrier signal by correlation with a C/A code pseudorandom code sequence; and aiding the controlling step with signals derived from the L1 carrier signal.

8. A method as defined in claim 7, wherein:

the aiding step includes comparing the phase of the L2 carrier signal with the phase of a signal derived from the L1 carrier signal.

9. A method as defined in claim 1, and further including the step of:

identifying and separating incoming signals from multiple satellites by means of locally generated P code sequences.

10. For use in a global positioning system (GPS) receiver, apparatus for deriving L2 carrier signals for enhanced accuracy, the apparatus comprising:

a receiving antenna, for receiving a GPS signal transmitted from each of a plurality of satellites, the signal containing an encrypted version of a pseudorandom code sequence known as P code;

a P-code generator, for independently generating a replica of the P-code pseudorandom code sequence;

a correlator circuit, for correlating the received encrypted P-code sequence with the locally generated replica of the P-code sequence;

a bandpass filter, for filtering the signal obtained from the correlator circuit; and a squaring circuit, for squaring the correlated and filtered signal, to obtain the L2 carrier signal with a relatively good signal-to-noise ratio.

11. Apparatus as defined in claim 10, and further comprising:

digital signal processing circuitry, for processing the L2 carrier signal output from the squaring circuit, to produce a control signal to adjust the timing of the P-code generator to maximize output of the L2 carrier signal, and to obtain signals indicative of a pseudo-range for each satellite.

12. Apparatus as defined in claim 11, wherein:

the apparatus further comprises means for recovering an L1 carrier signal by correlation with a C/A code pseudorandom code sequence; and the digital processing circuitry includes means for aiding controlling of the P-code generator, using signals derived from the L1 carrier signal.

13. Apparatus as defined in claim 12, wherein:

the means for aiding includes means for comparing the phase of the L2 carrier signal with the phase of a signal derived from the L1 carrier signal.

14. Apparatus as defined in claim 10, wherein:

the bandpass filter has a bandwidth of approximately 500 kHz.

15. Apparatus as defined in claim 10, wherein:

the bandpass filter has a bandwidth of approximately $\pm f_{null}/2$ centered in the frequency spectrum of the signal obtained from the correlator circuit, where $\pm f_{null}$ define the positions of primary null points in the frequency spectrum.

16. Apparatus as defined in claim 10, wherein:

the bandpass filter has a bandwidth less than about 10 megahertz and more than about 25 kilohertz.

17. A method of processing received signals in a global positioning system (GPS) used for navigation, to derive the benefit of P-code signals that have been encrypted, the method comprising the steps of:

receiving a signal transmitted from each of a plurality of satellites, the signal containing an encrypted version of a pseudorandom code sequence known as P code;

independently generating a replica of the P-code pseudorandom code sequence;

correlating the received encrypted P-code sequence with the locally generated replica of the P-code sequence;

bandpass filtering the result of the correlation step;

squaring the correlated and filtered signal;

processing the squared signal to derive a frequency spectrum containing a distinct peak indicative of the timing relationship between the received P-code sequence and its locally generated replica; and controlling the step of generating a replica of the P-code sequence, to maximize the peak in the frequency spectrum and obtain an accurate measure of signal arrival time for use in position determination.

18. A method as defined in claim 17, wherein:

the step of bandpass filtering the result of the correlating step is performed with a bandwidth of approximately $\pm f_{null}/2$ centered in the frequency spectrum obtained from the correlating step, where $\pm f_{null}$ define the positions of primary null points in the frequency spectrum.

19. A method as defined in claim 17, wherein:
the step of bandpass filtering the result of the correlating step is performed with a bandwidth less than about 10 megahertz and more than about 25 kilohertz.

20. A method as defined in claim 17, wherein:
the step of bandpass filtering the result of the correlating step is performed with a bandwidth of approximately 500 kilohertz.

21. For use in a global positioning system (GPS) navigation receiver, apparatus for employing P-code signals for enhanced position determination accuracy, the apparatus comprising:
a receiving antenna, for receiving a GPS signal transmitted from one of a plurality of satellites, the signal containing an encrypted version of a pseudorandom code sequence known as P code;
a P-code generator, for independently generating a replica of the P-code pseudorandom code sequence;
a correlator circuit, for correlating the received encrypted P-code sequence with the locally generated replica of the P-code sequence;
a bandpass filter, for filtering the signal obtained from the correlator circuit;
a squaring circuit, for squaring the correlated and filtered signal;
digital signal processing circuitry, for processing the squared signal to derive a frequency spectrum containing a distinct peak indicative of the timing relationship between the received P-code sequence and its locally generated replica; and
a feedback circuit for controlling the P-code generator, to maximize the peak in the frequency spectrum and obtain an accurate measure of signal arrival time for use in position determination.

22. Apparatus as defined in claim 21, wherein:
the bandpass filter has a bandwidth of 500 kilohertz.

23. Apparatus as defined in claim 21, wherein:
the bandpass filter has a bandwidth of approximately $\pm f_{null}/2$ centered in the frequency spectrum of the signal obtained from the correlator circuit, where $\pm f_{null}$ define the positions of primary null points in the frequency spectrum.

24. Apparatus as defined in claim 21, wherein:
the bandpass filter has a bandwidth less than about 10 megahertz and more than about 25 kilohertz.

25. A global positioning system (GPS) receiver, comprising:
a receiving antenna, for receiving GPS signals transmitted from one of a plurality of satellites, the signals including an L1 carrier signal modulated with a pseudorandom code known as C/A code, and an L2 carrier signal modulated with a pseudorandom code known as P code, wherein the P code sequence is encrypted before transmission;
an L1 receiver module for recovering the L1 carrier signal, including a C/A code generator and a correlation circuit for correlating the locally generated C/A code with the received L1 signals, to derive the L1 carrier signal and any data modulated onto it; and
an L2 receiver module for recovering the L2 carrier signal in spite of encryption of the P code sequence, including a P-code generator, for independently generating a replica of the P-code pseudorandom code sequence, a correlator circuit, for correlating the received encrypted P-code sequence with the locally generated replica of the P-code sequence, a bandpass filter, for filtering the signal obtained from the correlator circuit, and a squaring circuit, for squaring the correlated and filtered signal, to obtain the L2 carrier signal with a relatively good signal-to-noise ratio.

26. A GPS receiver as defined in claim 25, wherein the L2 receiver further includes:
digital signal processing circuitry, for processing the L2 carrier signal output from the squaring circuit, to produce a control signal to adjust the timing of the P-code generator to maximize output of the L2 carrier signal.

27. A GPS receiver as defined in claim 26, wherein:
the digital processing circuitry includes means for aiding controlling of the P-code generator, using signals derived from the L1 carrier signal.

28. A GPS receiver as defined in claim 27, wherein:
the means for aiding includes means for comparing the phase of the L2 carrier signal with the phase of a signal derived from the L1 carrier signal.

29. Apparatus as defined in claim 25, wherein:
the bandpass filter has a bandwidth of approximately 500 kHz.

30. Apparatus as defined in claim 25, wherein:
the bandpass filter has a bandwidth of approximately $\pm f_{null}/2$ centered in the frequency spectrum of the signal obtained from the correlator circuit, where $\pm f_{null}$ define the positions of primary null points in the frequency spectrum.

31. Apparatus as defined in claim 25, wherein:
the bandpass filter has a bandwidth less than about 10 megahertz and more than about 25 kilohertz.

32. A receiver as defined in claim 25, wherein the L2 receiver module further comprises:
switching means for bypassing the bandpass filter and the squaring circuit if the P code is not encrypted, wherein the L2 carrier is recovered solely by correlation with the locally generated P code.

* * * * *